United States Patent [19]
Aritake et al.

[11] Patent Number: 5,561,537
[45] Date of Patent: Oct. 1, 1996

[54] STEREOSCOPIC DISPLAY METHOD AND APPARATUS

[75] Inventors: Hirokazu Aritake; Masayuki Kato; Manabu Ishimoto; Noriko Sato, all of Kawasaki, Japan

[73] Assignee: Fujitsu Limited, Kawasaki, Japan

[21] Appl. No.: 542,712

[22] Filed: Oct. 13, 1995

Related U.S. Application Data

[63] Continuation of Ser. No. 125,003, Sep. 22, 1993, abandoned.

[30] Foreign Application Priority Data

Sep. 30, 1992 [JP] Japan ..................... 4-260921

[51] Int. Cl.⁶ .................. G02B 27/22; G03H 1/08; G03H 1/28
[52] U.S. Cl. .................... 359/23; 359/24; 359/9
[58] Field of Search .................. 359/9, 22, 23, 359/24, 25, 26; 348/40, 41

[56] References Cited

U.S. PATENT DOCUMENTS 3,614,426 10/1971 Donzelle ..................... 359/24

OTHER PUBLICATIONS

"Stereoscopic Approach to 3-D Display Using Computer-—Generated Holograms", T. Yatagai, Applied Optics, vol. 15, No. 11, Nov. 1976, New York, pp. 2722–2729.

"Three–Dimensional Stereoscopic Display Using Ray Traced Computer Generated Holograms", P. W. McOwan et al., Optics Communications, vol. 82, No. 1/2, Apr. 1, 1991, Amsterdam, pp. 6–11.

"Computer Graphics for Holography", K. Haines et al., IEEE Computer Graphics and Applications, vol. 12, No. 1, Jan. 1992, Los Alamitos, California, pp. 37–46.

"Image Processing Technique for Arbitrary Image Positioning in Holographic Stereogram", Der–Kuan Kang et al., Optics Communications, vol. 80, No. 1, Dec. 1, 1990. Amsterdam, pp. 7–12.

"Automatic Recording Method for Holographic Three–Dimensional Animation", M. Yamaguchi et al., Journal of the Optical Society of America A, vol. 9, No. 7, Jul. 1992, Wash. DC, pp. 1200–1205.

"Real–Time Holographic 3D Imaging Based on Multiplexing Techniques and Optoelectronic Holograms", E. Schulze, Proceedings of the SPIE, vol. 812, 1987, Bellingham, pp. 120–127.

"New Computational Control Techniques and Increased Understanding for Stereo 3–D Displays", S. P. Williams et al., Proceedings of the SPIE, vol. 1256, 1990, Bellingham, pp. 73–82.

Primary Examiner—Jon W. Henry
Attorney, Agent, or Firm—Staas & Halsey

[57] ABSTRACT

The position of a solid image which changes with the elapse of time is detected. The position of a virtual screen is set so that a distance from an object enters an allowable range such as to reduce a fatigue of an observer. A 2-dimensional image is formed at the set virtual screen position. A phase distribution is calculated at the hologram forming surface, thereby displaying a solid image. Even when the position of a solid image changes with the elapse of time, the fatigue of the eyes can be minimized.

14 Claims, 41 Drawing Sheets

STEREOSCOPIC DISPLAY METHOD AND APPARATUS

This application is a continuation of application Ser. No. 08/125,003, filed Sep. 22, 1993, now abandoned.

BACKGROUND OF THE INVENTION

1. Field of the Invention

The present invention relates to a stereoscopic display method and apparatus for calculating a phase distribution of a hologram from 2-dimensional images at different visual point positions and displaying a solid image by an optical wave front conversion of a reproduction light and, more particularly, to a stereoscopic display method and apparatus for displaying a solid image as a moving image.

2. Description of the Related Art

Various kinds of studies and developments have conventionally been performed with respect to a display method of enabling a solid image to be stereoscopically seen. The conventional stereoscopic display method relates to the double-eye type represented by the glasses type and is based on a system for obtaining a stereoscopic feeling by a convergence of both eyes or a parallax of both eyes by allowing different images to be seen by the right and left eyes. There is a Lenticular method of the multieye type which is an extension of the double-eye type method. The principle for the stereoscopic observation of the Lenticular method is similar to that of the double-eye type. According to such conventional stereoscopic display methods, even when the observer moves the head to the right and left, no difference (kinetic parallax) occurs in a solid image to be observed, only an unnatural solid image can be seen.

A holographic stereogram can be mentioned as means for eliminating such a problem. In the holographic stereogram, a 2-dimensional video image including a parallax is recorded on elongated slit-shaped segment holograms which are long in the vertical direction and a number of such segment holograms are arranged in the horizontal direction. Therefore, even when the observer moves the head to the right and left, a natural stereoscopic feeling can be obtained. There is also a holographic stereogram including a parallax in the vertical direction.

The conventional holographic stereogram having a horizontal parallax will now be described. As shown in FIG. 1, objects 332 and 334 are photographed while changing the position of a camera from a position 330-1 to a position 330-n. As shown in FIG. 2, a laser beam 342 is irradiated to a film 336 obtained by the photographing operation in FIG. 1. The light transmitted through the film 336 is projected onto a diffusion plate 340 through a lens 338 and an object light 344 is irradiated onto a hologram dry plate 352. A slit 350 of a slit plate 348 is located in front of the hologram dry plate 352 in correspondence to the photographing position. An interference fringe (phase distribution) is exposed and recorded by an interference with a reference light 354.

As shown in FIG. 3, there is also a method of forming an image hologram. Namely, a laser beam (reproduction light) is irradiated onto the hologram dry plate 352 formed in FIG. 2 so as to be converged at a reproduction light source 355 shown as a virtual image. The laser beam is wave front converted into the object light 344 by the hologram dry plate 352. Another hologram dry plate is provided at the display position of the image by the object light 344. A reference light 362 is irradiated to the dry plate and the image on the dry plate is exposed, thereby forming an image hologram 360. As shown in FIG. 4, by irradiating a reproduction light 364 to the image hologram 360, it is converted into the wave front, so that a solid image can be recognized when it is seen from an eyesight region 366.

In the case where a moving image which changes with the elapse of time is stereoscopically displayed by such a conventional holographic stereogram, a phase distribution of the hologram dry plate 352 shown in FIG. 2 is obtained by a calculation, a display apparatus such as a liquid crystal device or the like is driven, the phase distribution is expressed, and the reproduction light is converted into the wave front.

In the case of displaying a solid image of a moving image by expressing the phase distribution obtained by the calculation on the display apparatus, however, there is a problem that a fatigue of the observer is large. This is because in the case of the moving image display, the position of the solid image to be displayed changes in accordance with the elapse of time. In the holographic stereogram, however, the position (hereinafter, referred to as "virtual screen position") at which a 2-dimensional image is formed is fixed to calculate a phase distribution of the hologram forming surface. Therefore, even when the position of the solid image changes with the elapse of time, the virtual screen position at which the 2-dimensional image is produced doesn't change, so that a fatigue of the observer increases. That is, an angle of convergence of the eyes of the observer is changed in accordance with the time-dependence position of the solid image. The image is actually fixed to the virtual screen position, however, so that when a focal point is set to the virtual screen, a contradiction occurs between the focal point and the angle of convergence and a disturbance occurs in the ecological feedback and the observer is tired.

Moreover, a fact that there is a tendency such that the allowable range of the positional relation between the screen and the solid image is narrowed as the solid image is located near the screen is known (Masuda, "3-dimensional Display", issued by Sangyo Tosho Co., Ltd., pages 42 to 44, May 25, 1990). There is, consequently, a problem such that when a moving image is displayed, the position of the solid image which is displayed on the virtual screen existing at a relatively near position is away from the screen, and a degree of fatigue of the observer further increases.

SUMMARY OF THE INVENTION

According to the invention, there are provided a stereoscopic display method and apparatus, in which in the display of a moving image of a solid image by a calculated phase distribution, even when the position of the solid image changes with the elapse of time, a fatigue of the observer can be minimized.

According to a stereoscopic display method of the invention, 3-dimensional information such that the image position changes with the elapse of time is first produced. A virtual screen to produce a 2-dimensional image is subsequently set in accordance with the image position which was obtained from the produced 3-dimensional information and which changes with the elapse of time. A plurality of 2-dimensional images of different visual directions are formed from the 3-dimensional information onto the image screen which has been set as mentioned above. A phase distribution on the hologram forming surface is calculated from those plurality of 2-dimensional images. The calculated phase distribution is expressed on the hologram forming surface when a solid image is displayed. A reference light is irradiated to the phase distribution and is converted into the optical wave front, thereby displaying a solid image.

The virtual screen surface is now set to a position which passes through at least the center of gravity of the object. In the case where a plurality of display targets exist, the virtual screen position which changes with the elapse of time is set for each object. In this case, the virtual screen position which changes with the elapse of time can be also set while regarding a plurality of objects as one target.

According to such a stereoscopic display method of the invention, the position of a solid image which varies with the elapse of time is detected and one of the virtual screens is set in a manner such that the distance of the virtual screen from the object enters an allowable limit in which a fatigue of the observer can be minimized. Consequently, even when the target to be displayed changes with the elapse of time, the fatigue of the observer can be reduced.

The above and other objects, features, and advantages of the present invention will become more apparent from the following detailed description with reference to the drawings.

DETAILED DESCRIPTION OF THE PREFERRED EMBODIMENTS (Fundamental construction of stereoscopic display apparatus and method)

Figure 1:
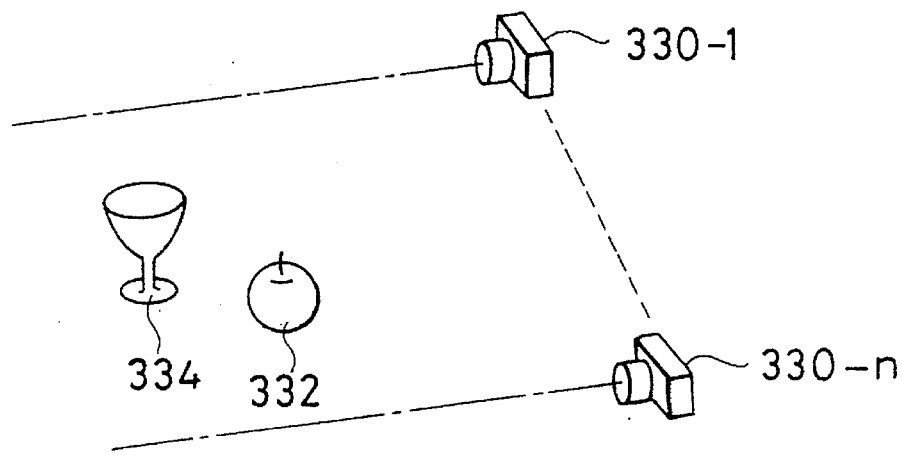
FIG. 1 is an explanatory diagram showing the position at which a target is photographed by forming a holographic stereogram.
Figure 2:
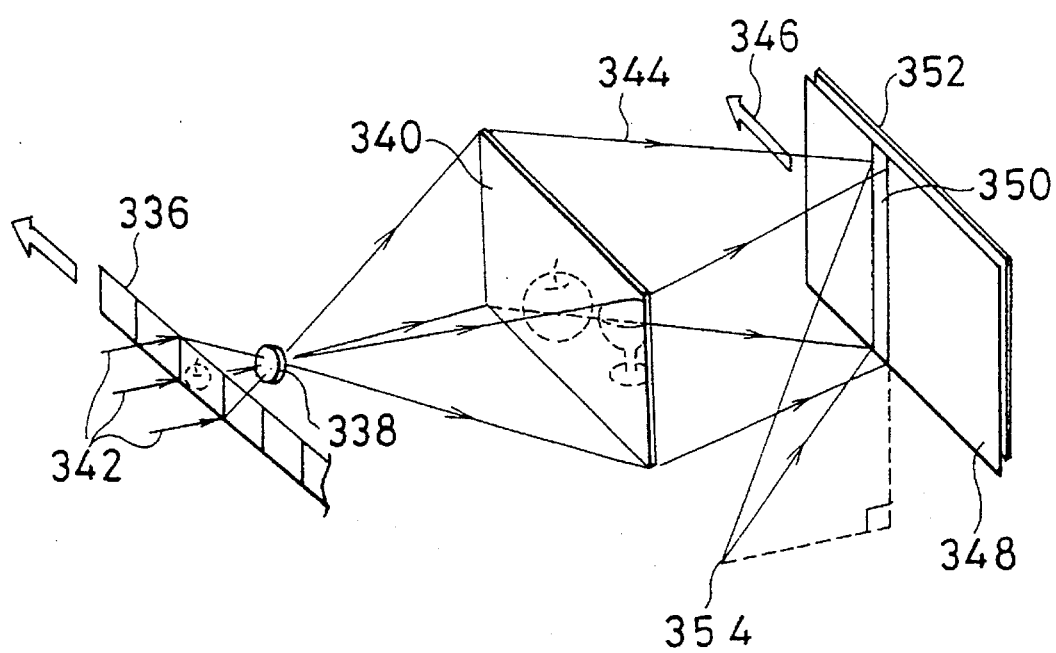
FIG. 2 is an explanatory diagram for forming a hologram by the exposure of a holographic stereogram using a film photographed in FIG. 1.
Figure 3:
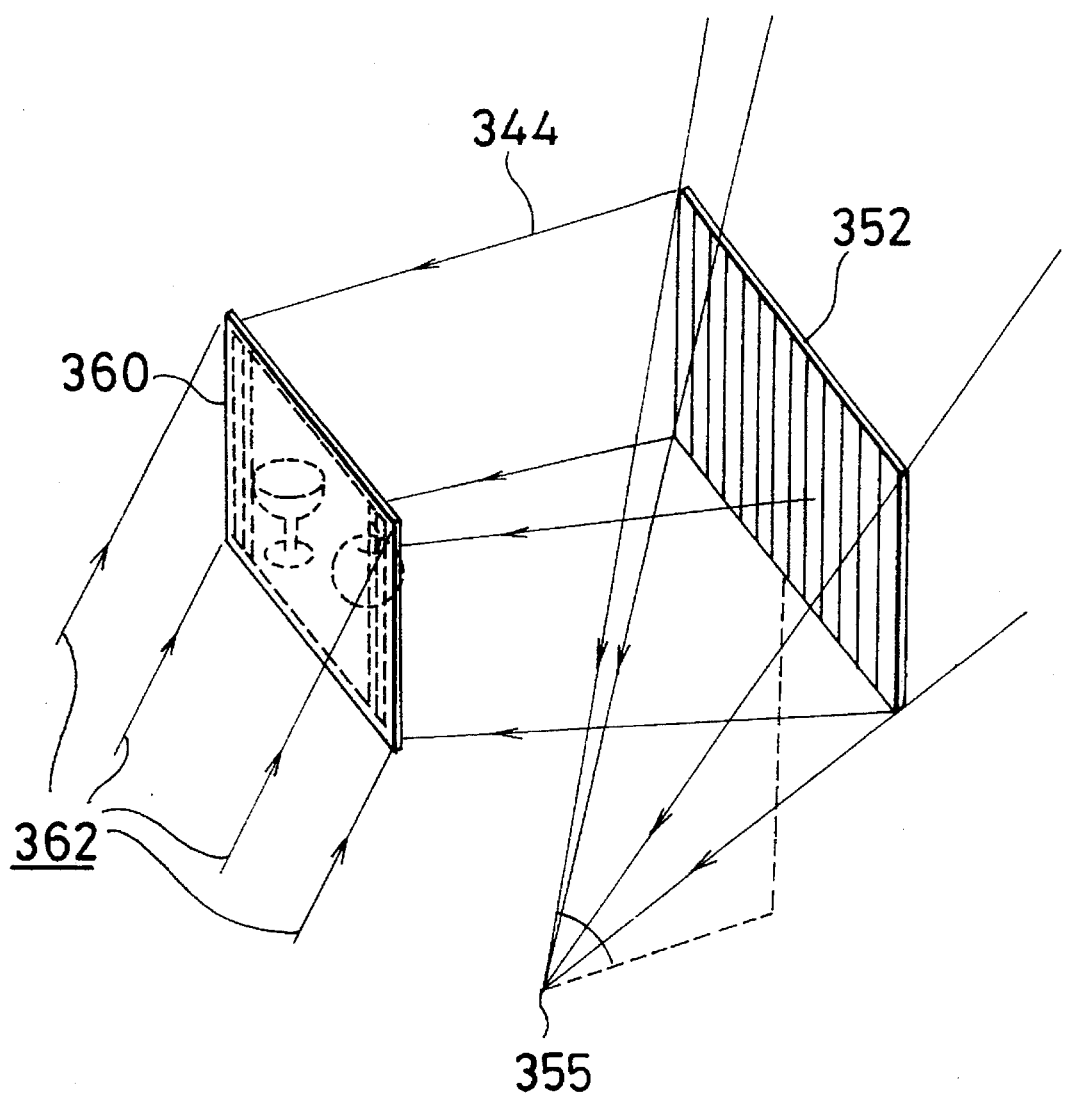
FIG. 3 is an explanatory diagram for forming an image hologram by using the hologram formed in FIG. 2.
Figure 4:
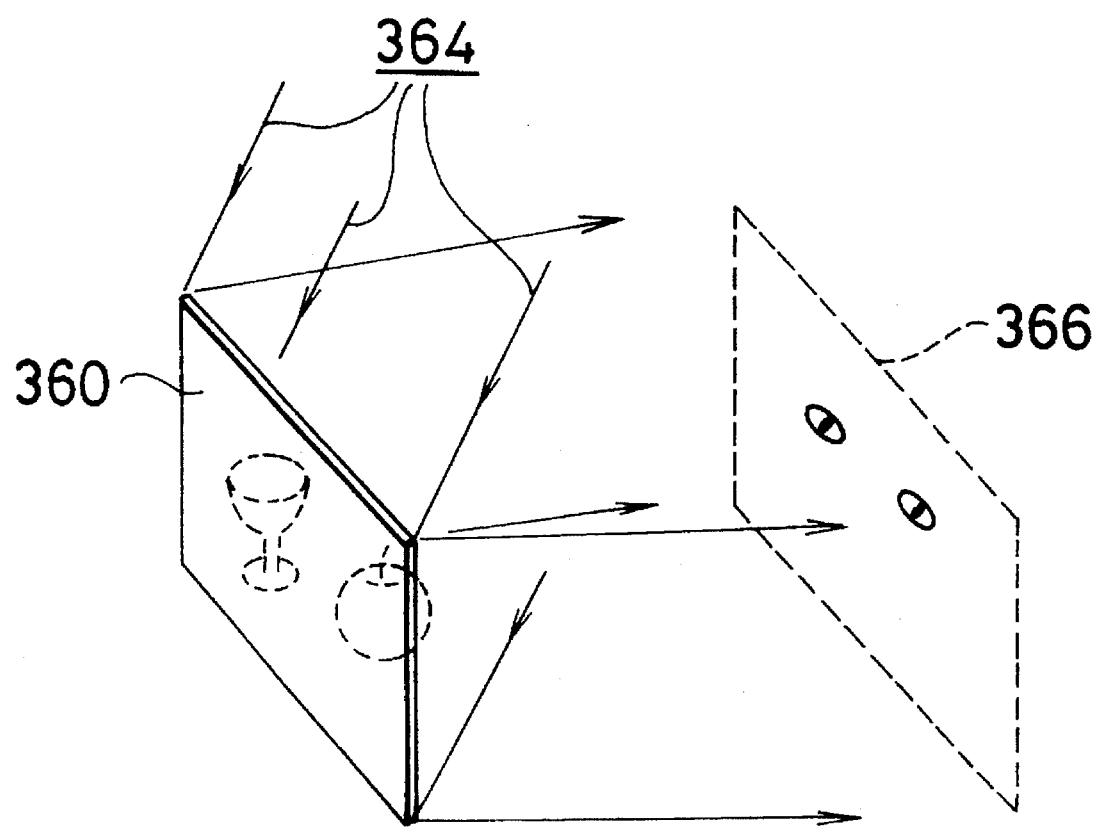
FIG. 4 is an explanatory diagram of the stereoscopic display by the image hologram formed in FIG. 3.
Figure 5:
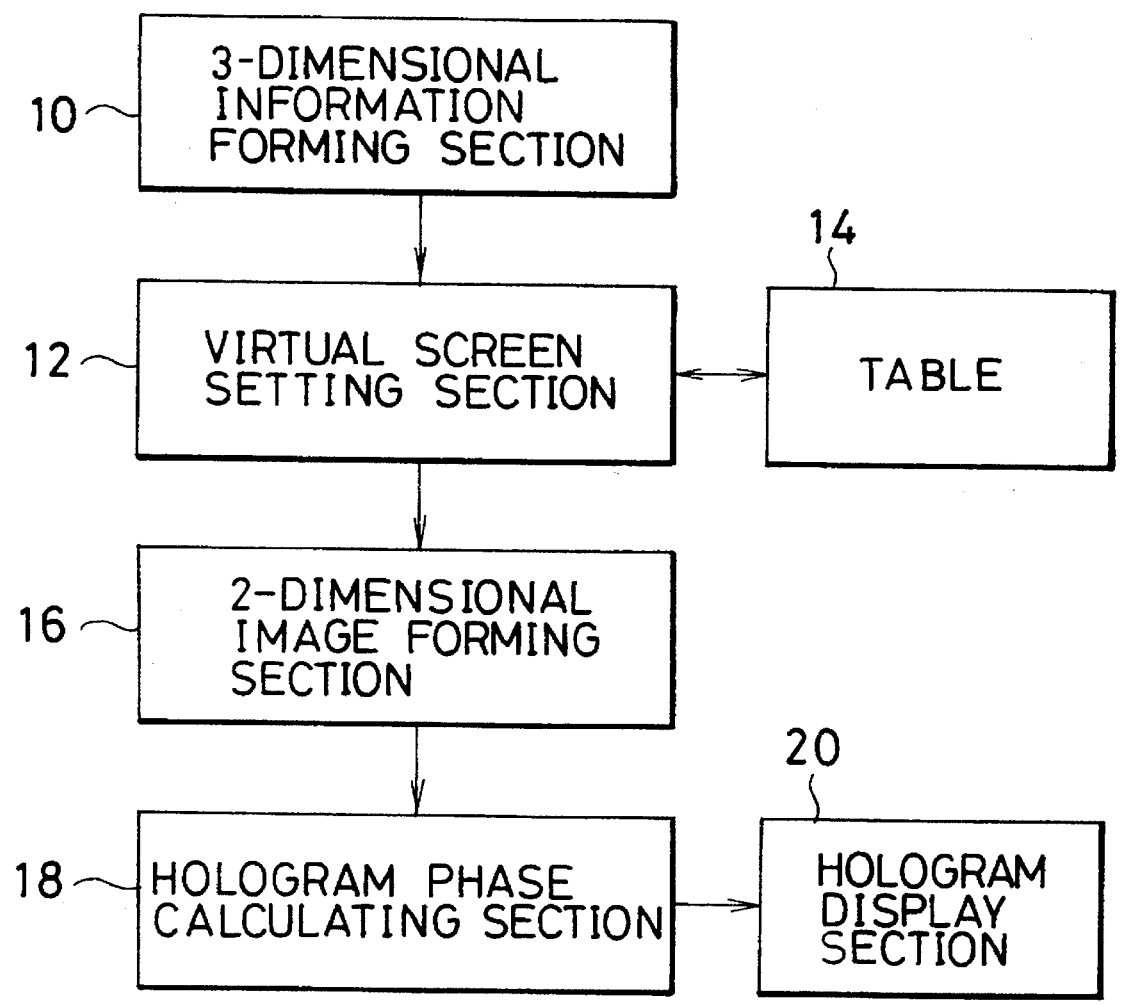
FIG. 5 is a constructional diagram of an embodiment of the present invention.

FIG. 5 shows an embodiment of a stereoscopic display apparatus of the invention. A 3-dimensional information forming section 10 forms 3-dimensional information of a target to be stereoscopically displayed by using a CAD system or the like. A virtual screen setting section 12 sets a virtual screen position. The set information of the optimum virtual screen position is stored into a table 14. A 2-dimensional image forming section 16 forms a 2-dimensional image onto the screen set by the virtual screen setting section 12. A hologram phase calculating section 18 calculates a phase distribution of a hologram from the 2-dimensional image formed by the 2-dimensional image forming section 16. A hologram display section 20 expresses the phase distribution calculated by the hologram phase calculating section 18 and converts into the wave front, thereby displaying a solid image. Further, the hologram phase calculating section 18 also calculates the phase distribution of the image hologram.

Figure 6:
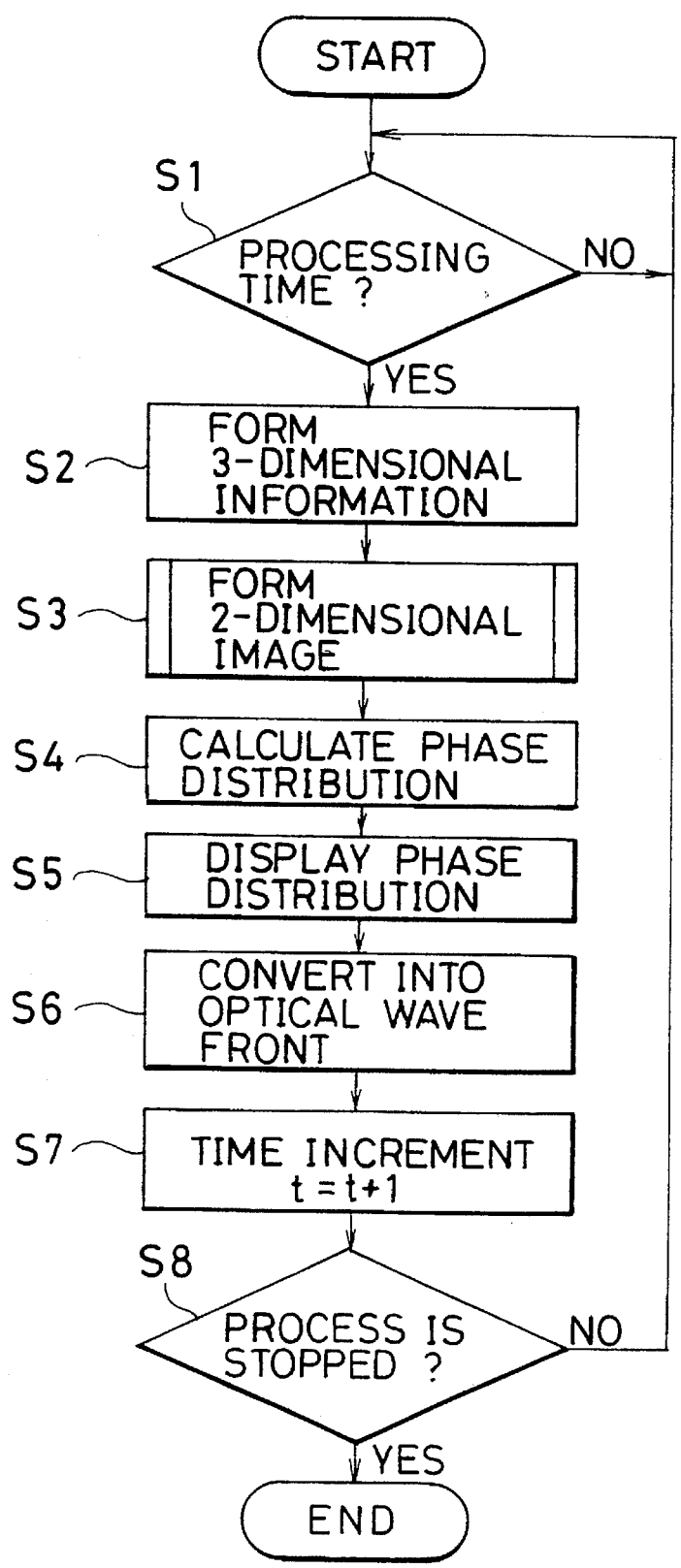
FIG. 6 is a flowchart showing a fundamental processing procedure of a stereoscopic display method according to the invention.

A flowchart of FIG. 6 shows a fundamental processing procedure of a stereoscopic display method of the invention. First, in step S1, a check is made to see if a predetermined processing time has come or not. If YES, step S2 follows and 3-dimensional information including an object structure or the like to be displayed is formed. In step S3, a 2-dimensional image is formed from the 3-dimensional information. The formation of the 2-dimensional image is shown in detail in a flowchart of FIG. 7.

Figure 7:
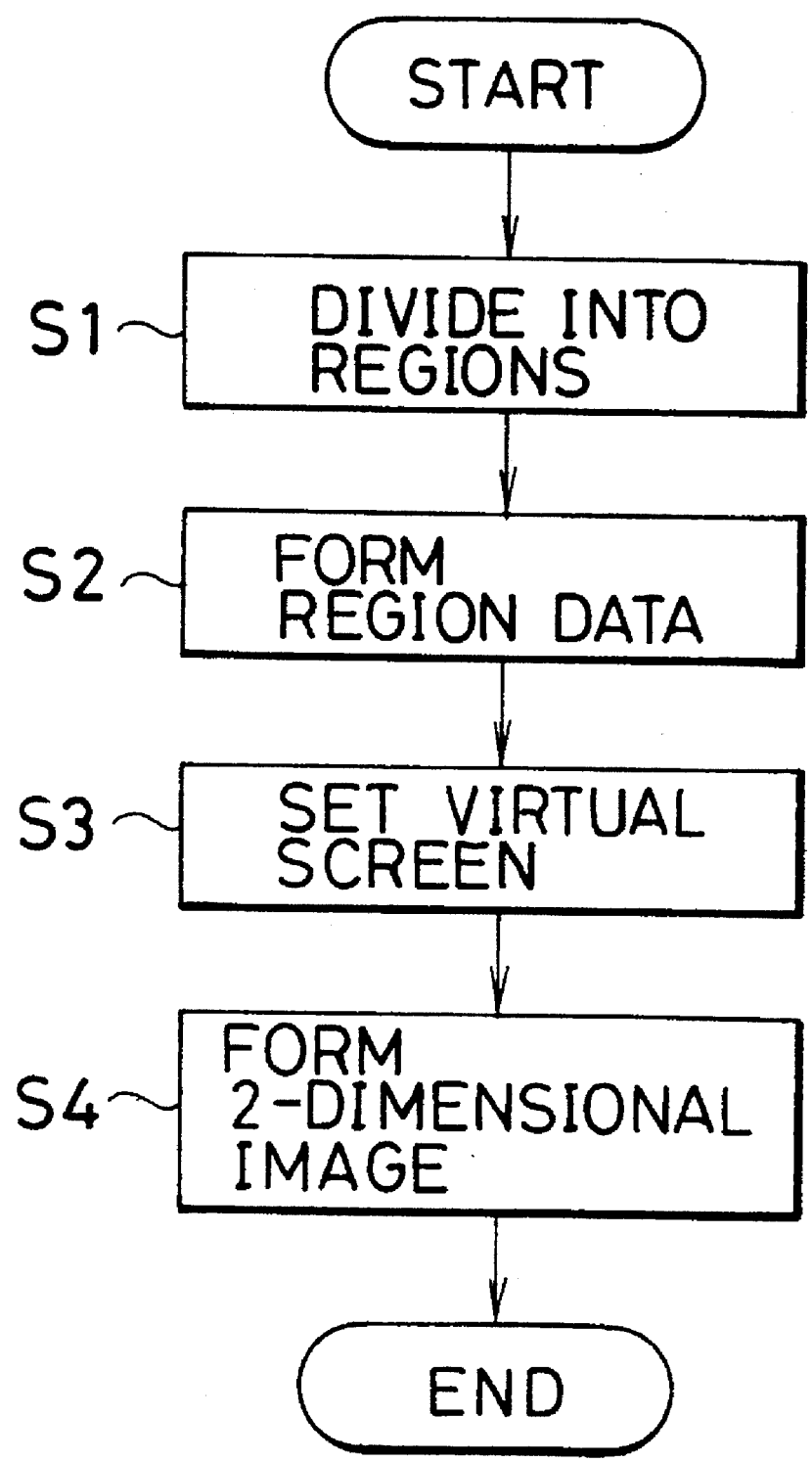
FIG. 7 is a flowchart showing the details of a 2-dimensional image forming step in FIG. 6.

In the process to form the 2-dimensional image in FIG. 7, the 3-dimensional information is first divided into a region for every object or regions for every plurality of objects in step S1. 3-dimensional data is formed for each of the divided regions in step S2. In step S3, a virtual screen is formed with respect to the 3-dimensional data of each region. In step S4, a 3-dimensional image is finally projected onto the virtual screen, thereby forming a 2-dimensional image. The details of the setting of the virtual screen in the 2-dimensional image forming process will be clearly explained hereinafter.

FIG. 6 will be again explained. After the 2-dimensional image was formed in step S3, a phase distribution is calculated in step S4. As a method of calculating the phase distribution, there are the following three methods: a method of calculating the phase distribution on the basis of a plurality of 2-dimensional images having parallaxes in both of the horizontal and vertical directions; a method of calculating the phase distribution on the basis of a plurality of 2-dimensional images having a parallax in only the horizontal direction; and a method of dividing a 2-dimensional image and calculating the phase distribution for each of the divided regions. Those three calculating methods of the phase distribution will be clearly described in detail hereinafter. Further, the calculation of the phase distribution also includes the calculation of a phase distribution to form an image hologram. After completion of the calculation of the phase distribution in step S4, a liquid crystal device or the like is driven and the calculated phase distribution is displayed in step S5. In step S6, a reference light is irradiated to the liquid crystal device in which the phase distribution has been displayed and is converted into the optical wave front, thereby displaying a solid image. Subsequently, a time t is increased by only a predetermined time unit in step S7. In step S8, a check is made to see if the process is stopped or not. If NO, the processing routine is returned to step S1 and the processing time is incremented. The calculation of the phase distribution of the next processing time and the display of a solid image are executed. For example, in the case of a stereoscopic display of a moving image, by executing the time-dependent processes in FIG. 6 at a period of time of 1/30 second, the smooth motion of the moving image can be displayed. The invention is not limited to the display of the moving image for every predetermined time but can be also applied to the case where the display position of the solid image changes with the elapse of time.

(Virtual screen and object position)

Figure 8:
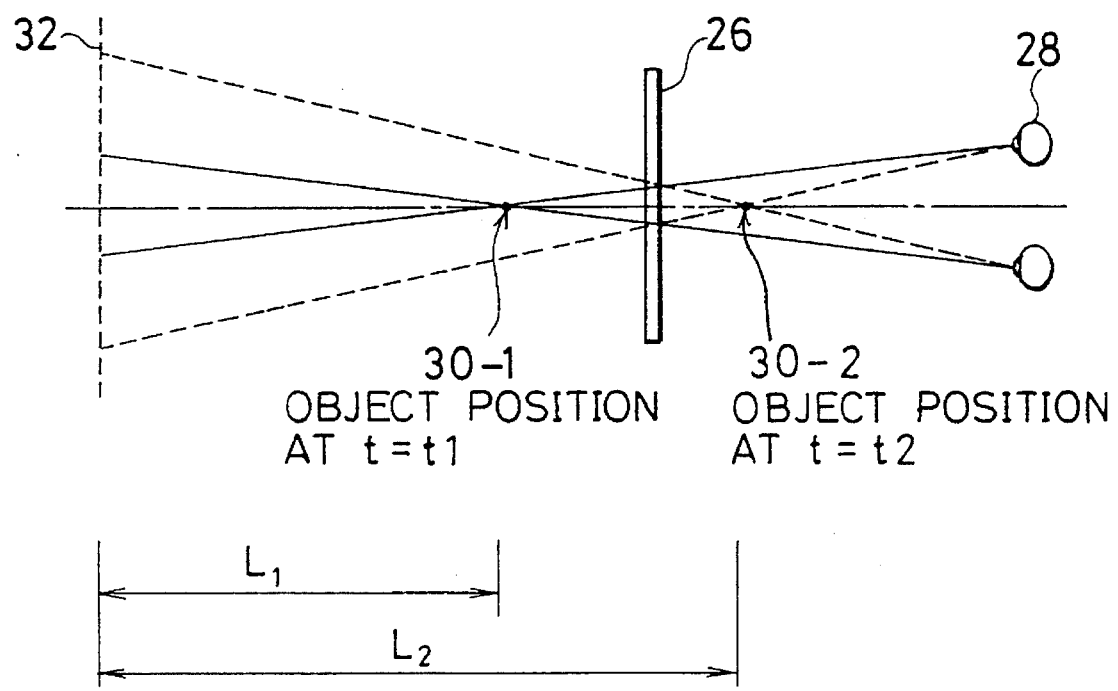
FIG. 8 is an explanatory diagram showing the relation between the conventional virtual screen and the object position which changes with the elapse of time.

A method of setting a virtual screen surface in the invention will now be described. FIG. 8 shows the relation between the object position in the conventional holographic stereogram and the virtual screen. A visual point of an observer 28 is located on the right side of a holographic stereogram 26. Hitherto, the position of a virtual screen 32 has fixedly been determined. In this state, it is now assumed that the object was moved from an object position 30-1 which is far from the observer at time $t=t_1$ to an object position 30-2 which is close to the observer at next time $t=t_2$. In such a movement from the object position 30-1 to the object position 30-2, a angle of convergence of the eyes of the observer 28 is small in case of the remote object position 30-1, while it is large in case of the near object position 30-2. However, the position of the virtual screen 32 to which the observer intends to set the focal point has been fixed. Therefore, at the object position 30-2 that is remote from the virtual screen 32, an ecological feedback operation such that the of convergence angle is set to the object position 30-2 and, at the same time, the focal point is set to the virtual screen 32 is executed, so that a fatigue of the observer increases. In other words, in the case where a distance $L_1$ from the fixed virtual screen 32 to the object position 30-1 changes to a distance $L_2$ at the object position 30-2 from the virtual screen 32, in the display of a moving image in which a change amount between the distances $L_1$ and $L_2$ is large, the fatigue of the eyes of the observer is fairly large.

Figure 9:
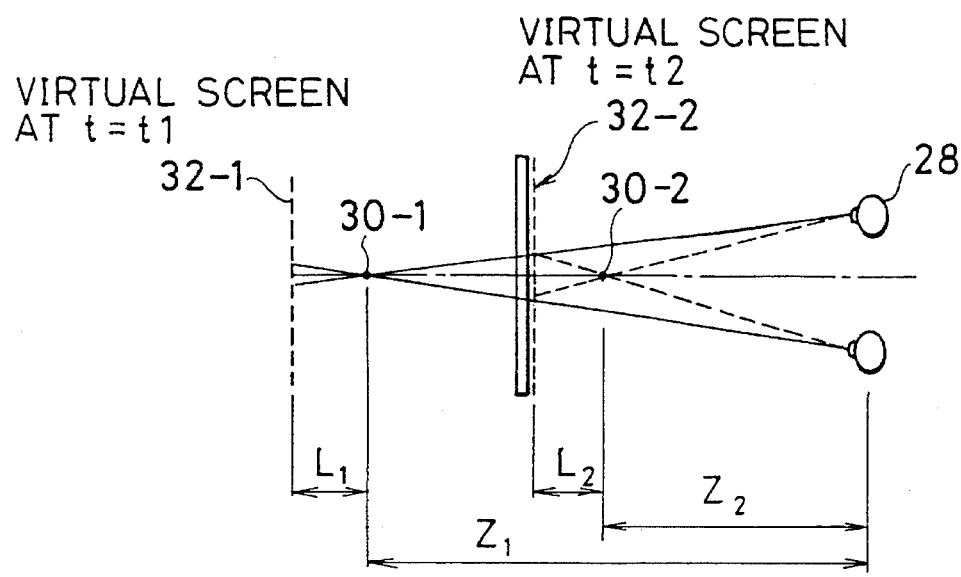
FIG. 9 is an explanatory diagram showing the relation between the virtual screen which is set according to the invention and the object position which changes with the elapse of time.

According to the invention, therefore, as shown in FIG. 9, the positions of virtual screens 32-1 and 32-2 are also changed in accordance with the time-dependent changes in the object positions 30-1 and 30-2. Namely, as for the object position 30-1 at time $t=t_1$, the virtual screen 32-1 is set to the distance $L_1$ at which the observer feels no fatigue even when the focus adjustment is executed to the angle of convergence in this instance. With respect to the object position 30-2 at time $t=t_2$ as well, the virtual screen 32-2 is set to the distance $L_2$ at which the observer feels no fatigue even when the focus adjustment is executed by the angle of convergence to the object position 30-2.

Figure 10:
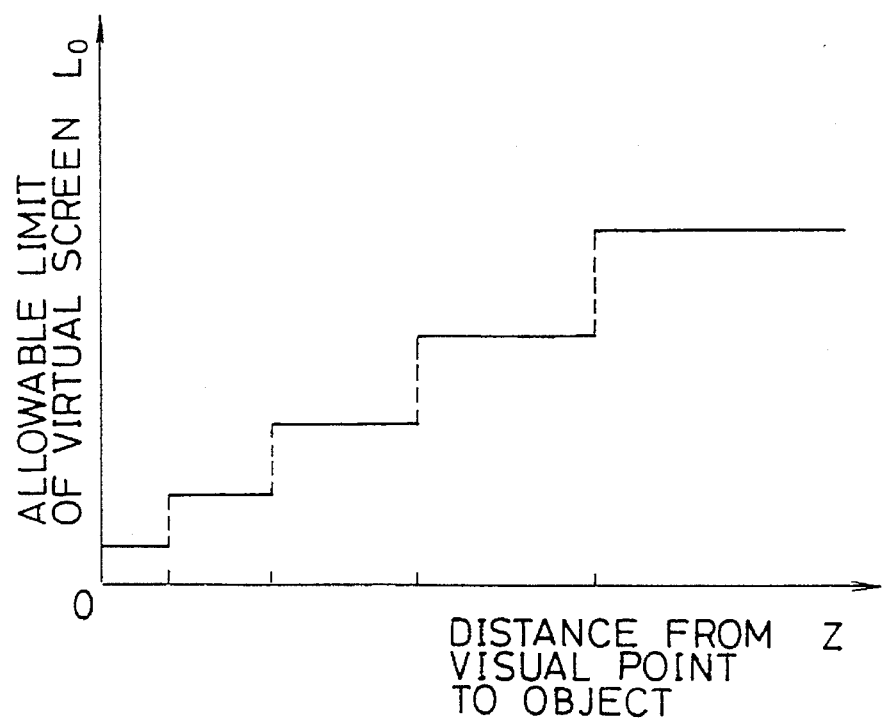
FIG. 10 is a characteristic diagram showing an allowable limit of the setting position of a virtual screen to the distance from a visual point to the object position according to the invention.

There are relations such that the intervals $L_1$ and $L_2$ between the virtual screens 32-1 and 32-2 and the object positions 30-1 and 30-2 depend on distances $Z_1$ and $Z_2$ from the visual point of the observer 28. Generally, as a distance Z from the visual point of the observer 28 to the object position is small, an allowable distance L of the virtual screen to the object position is small. On the contrary, as the object position is far from the observer 28, the interval between the virtual screen and the object position can be increased. FIG. 10 shows characteristic data stored in the table 14 in FIG. 5 for setting the virtual screen in the invention. An axis of abscissa denotes a distance Z from the visual point of the observer to the object position. An axis of ordinate indicates an allowable limit $L_0$ from the object position to the virtual screen. In the characteristics of FIG. 10, when the distance Z between the visual point and the object is short, the allowable limit $L_0$ of the virtual screen is small and the virtual screen must be set so as to be close to the object position. On the other hand, when the distance Z from the visual point to the object is large, the allowable limit $L_0$ from the object to the virtual screen can be largely set. A setting range of the visual screen for the object position is widened. Therefore, with respect to the position setting of the virtual screen of the invention, the virtual screen is set for the object position so as to lie within the allowable limit $L_0$ according to the characteristics of FIG. 10.

(Setting of virtual screen)

Figure 11:
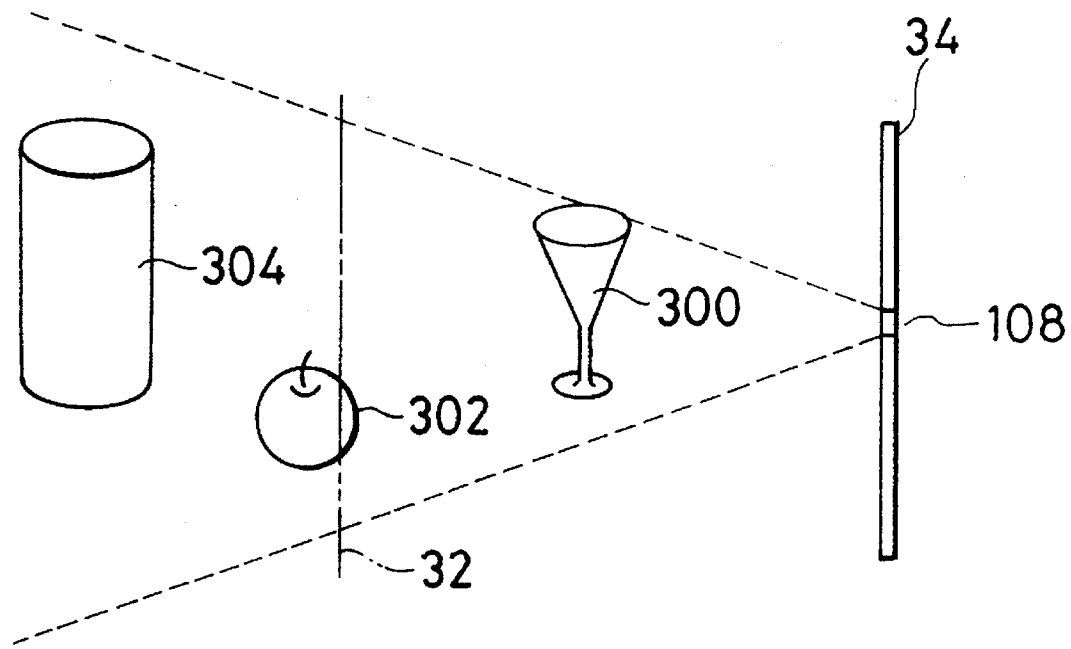
FIG. 11 is an explanatory diagram for setting a virtual screen while regarding a plurality of objects as one target according to the invention.

FIG. 11 shows the first embodiment of the method of setting a virtual screen for the 3-dimensional information in the invention. It is now assumed that targets 300, 302 and 304 to be displayed exist in front of a hologram forming surface 34 so as to be away from each other with respective distances. In the case where a plurality of targets exist in the depth direction as mentioned above, in the embodiment, the targets 300, 302 and 304 are regarded as one target and the virtual screen 32 is set to, for example, the position which passes through the center of gravity of such one target. The virtual screen 32 is set to a 2-dimensional plane which is parallel with the hologram forming surface 34.

Figure 12:
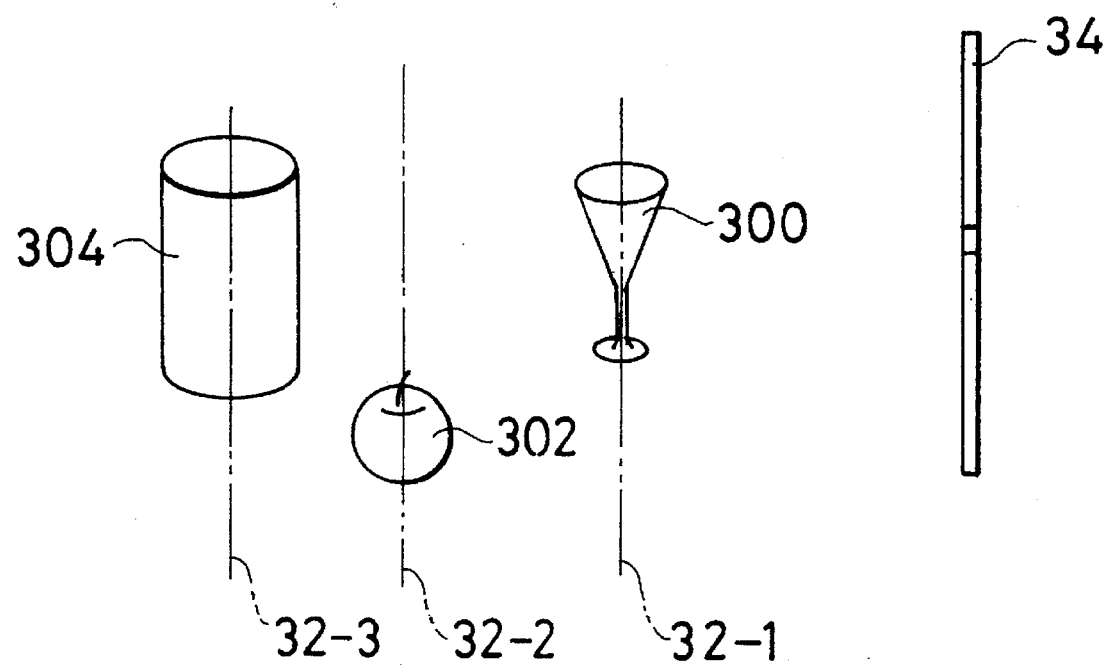
FIG. 12 is an explanatory diagram for setting a virtual screen every plurality of objects according to the invention.

FIG. 12 shows another setting method of a virtual screen surface according to the invention. According to the embodiment, virtual screens 32-1, 32-2 and 32-3 are set in the depth direction of the hologram forming surface 34 for each of a plurality of targets 300, 302 and 304. In this case, the virtual screens 32-1 to 32-3 are respectively set so as to pass through at least the centers of gravity of the targets 300, 302 and 304. Specifically speaking, the virtual screens 32-1 to 32-3 are set so as to pass through the centers of gravity and so as to be parallel with the hologram forming surface 34.

Figure 13:
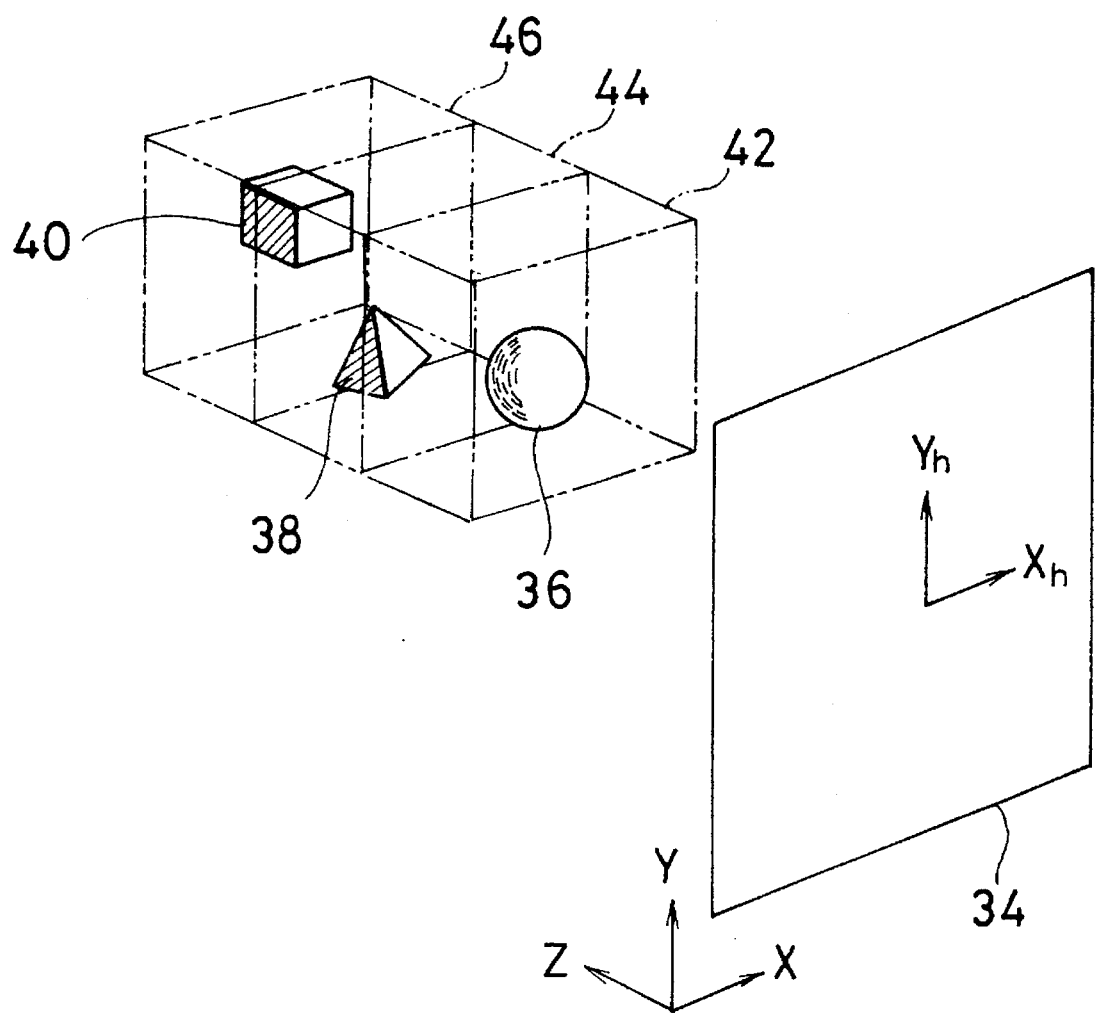
FIG. 13 is an explanatory diagram of the zone division of a plurality of objects according to the invention.
Figure 14:
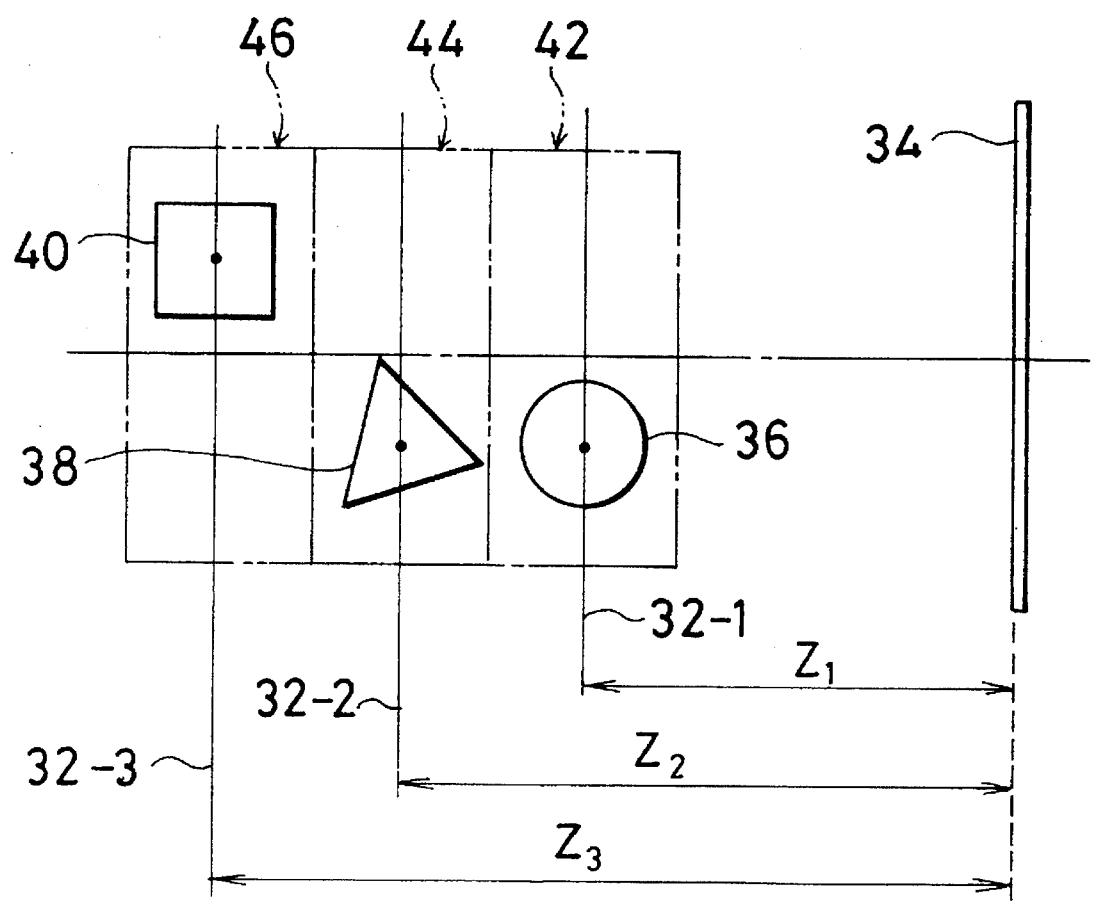
FIG. 14 is an explanatory diagram showing the setting of a virtual screen for each of the divided zones in FIG. 10.

FIG. 13 shows another setting method of a virtual screen surface in the invention. The embodiment is characterized in that a display target space is divided into a plurality of zones and, thereafter, a virtual screen is set for each of the divided zones. Namely, targets 36, 38, and 40 exist in the depth direction in a display space for the hologram forming surface 34. First, zones 42, 44, and 46 are set so as to include one of the targets 36, 38, and 40. The coordinates of XYZ are set into the target space and 2-dimensional coordinates $X_h$ and $Y_h$ are set to the hologram forming surface 34. Subsequently, as shown in FIG. 14, the virtual screens 32-1, 32-2, and 32-3 are set for each zones 42, 44, and 46. The positions of the virtual screens 32-1 to 32-3 are determined by the distances $Z_1$, $Z_2$, and $Z_3$ in the depth direction from the hologram forming surface 34. The distances $Z_1$, $Z_2$, and $Z_3$ in the depth direction can be used as parameters of the depth distances of the 2-dimensional image upon calculation of the phase distribution at the hologram forming surface 34.

Figure 15:
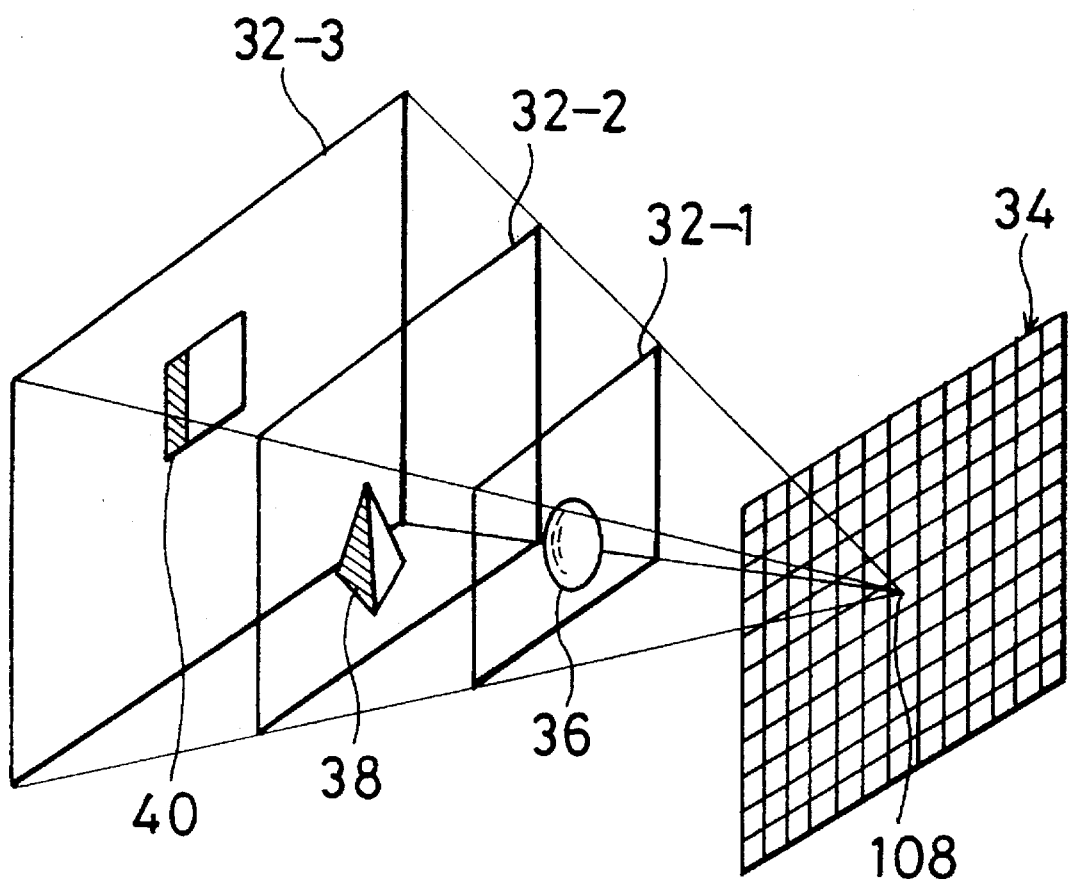
FIG. 15 is an explanatory diagram showing the formation of projection 2-dimensional data in the zone division in FIG. 14.

FIG. 15 shows the formation of projection 2-dimensional data for the virtual screens 32-1 to 32-3 set for divided zones shown in FIG. 14. Now, the hologram forming surface 34 is divided into a matrix form and micro hologram segments 108 are formed. The hologram segment 108 is determined by a display device, for example, a liquid crystal display device to display the calculated phase distribution. The formation of 2-dimensional data which is used to calculate the phase distribution of, for instance, the central hologram segment 108 will now be described. It is sufficient to execute the converting process from the 3-dimensional data to the 2-dimensional data such that the 2-dimensional images of the targets 36, 38, and 40 which were radially projected around the hologram segment 108 as a center are formed onto the virtual screens 32-1, 32-2, and 32-3.

Figure 16:
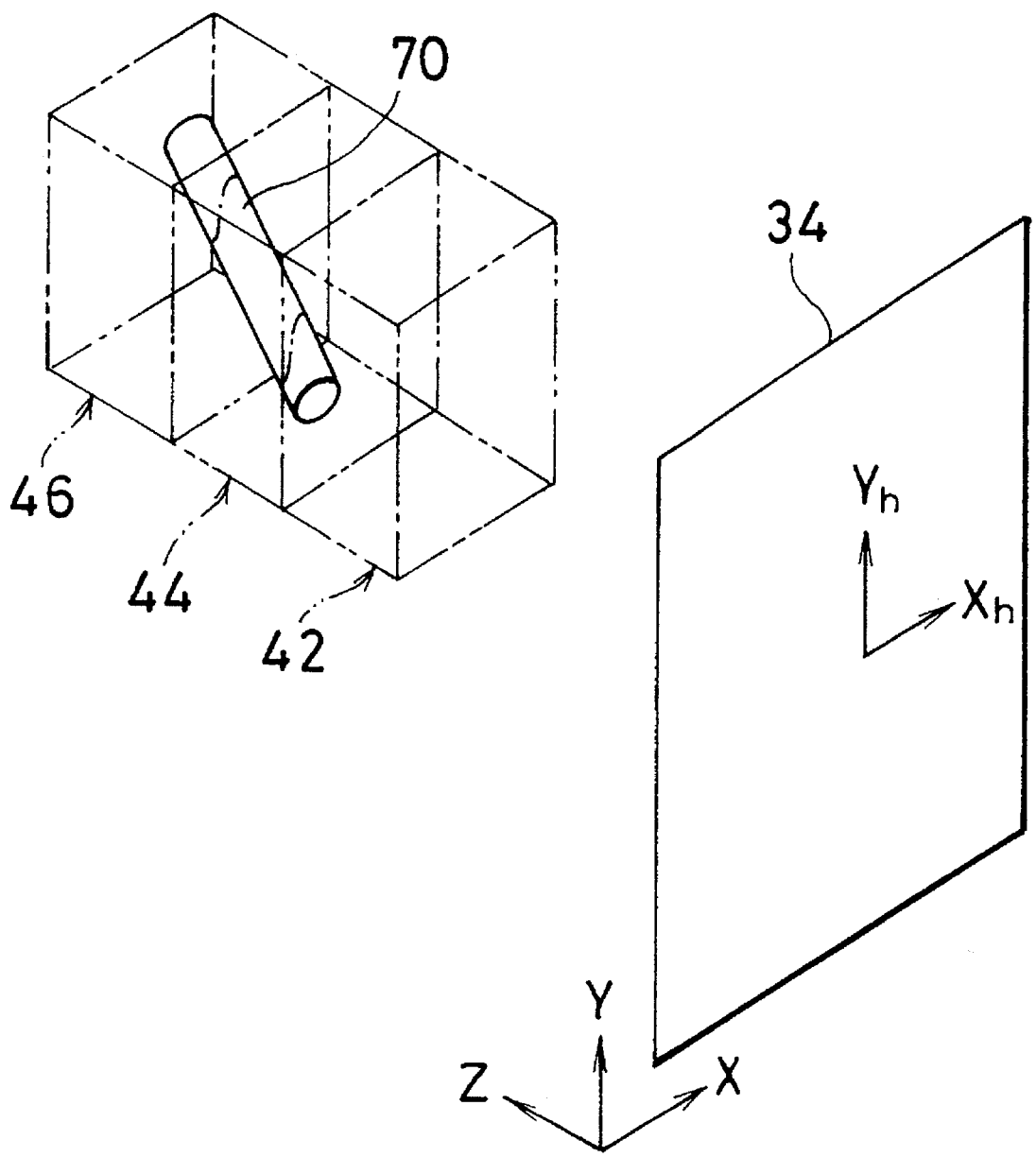
FIG. 16 is an explanatory diagram of the zone division of a single object having a depth dimension according to the invention.
Figure 17:
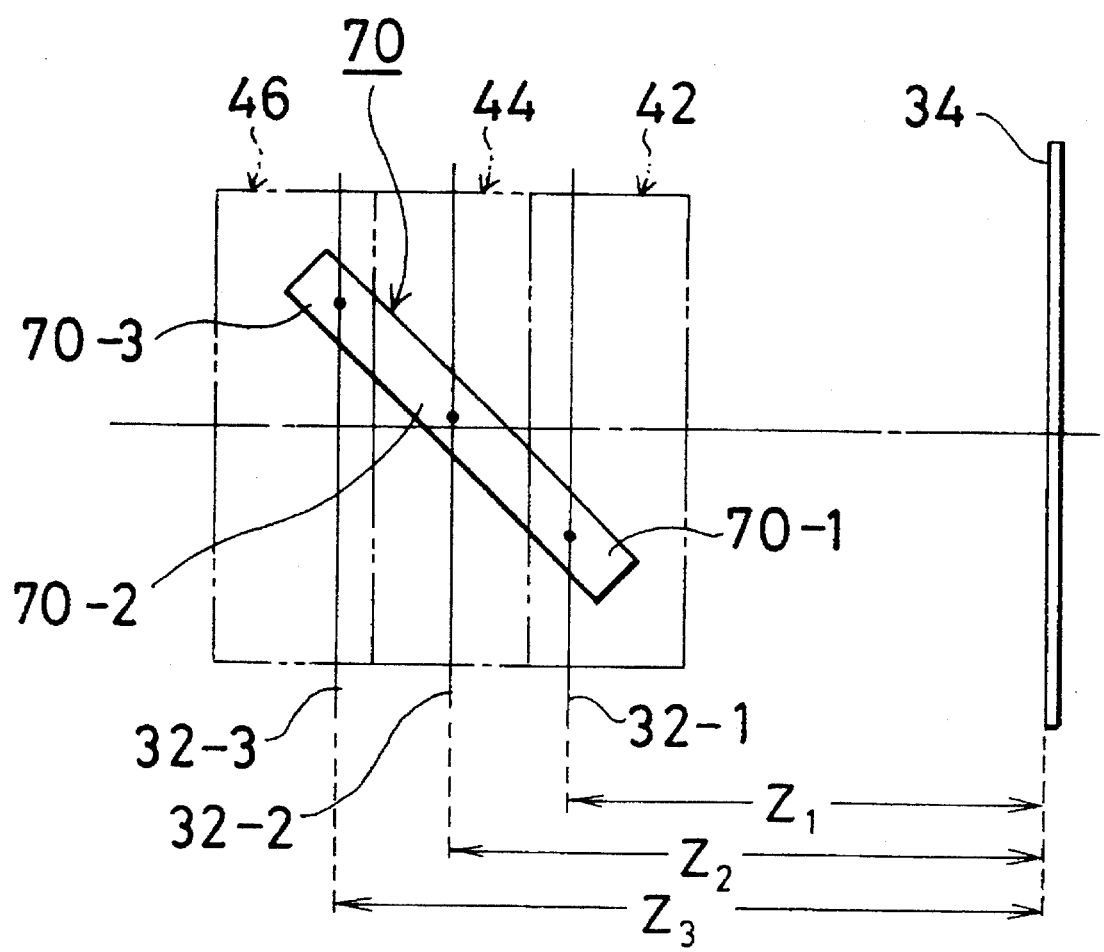
FIG. 17 is an explanatory diagram showing the setting of a virtual screen for each of the divided zones in FIG. 16.

FIG. 16 shows the case where a single object was divided into zones with respect to the case of setting a virtual screen by the zone division according to the invention. A cylindrical body 70 exists as a target to be displayed in the display space of the hologram forming surface 34. Three zones 42, 44, and 46 are set in the depth direction for the cylindrical body 70. For such a zone division, as shown in FIG. 17, the virtual screen planes 32-1, 32-2, and 32-3 are set for every zone 42, 44, and 46. In this case, the virtual screens 32-1, 32-2, and 32-3 are set so as to pass through the centers of gravity of cylindrical members 70-1, 70-2, and 70-3 which belong to each zone.

Figure 18:
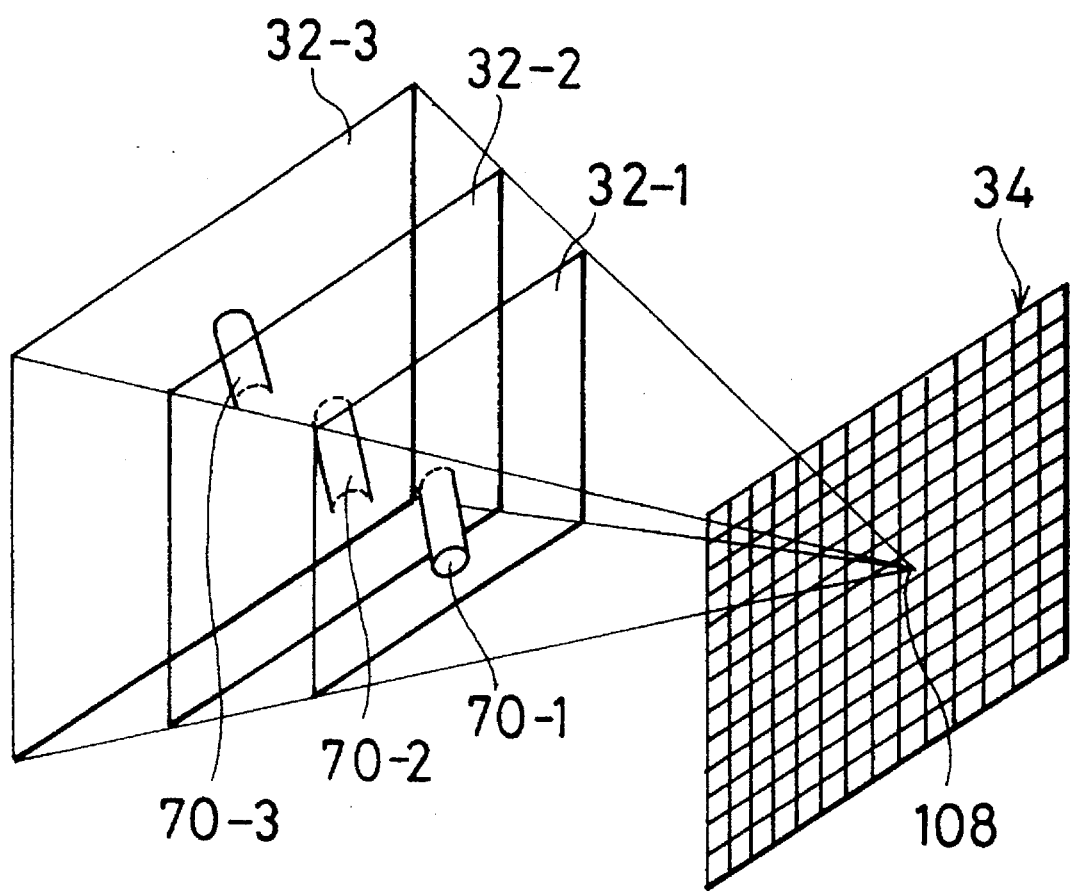
FIG. 18 is an explanatory diagram showing the formation of projection 2-dimensional data in the zone division in FIG. 17.

FIG. 18 shows the formation of projection 2-dimensional data in the case where a single target in the depth direction in FIG. 17 is divided into a plurality of virtual screens. The formation of 2-dimensional data which is used in the calculation of the phase distribution at the central hologram segment 108 of the hologram forming surface 34 will now be described as an example. Projection 2-dimensional data of the cylindrical members 70-1, 70-2, and 70-3 is formed by radially seeing the virtual screens 32-1, 32-2, and 32-3 from the hologram segment 108.

Figure 19:
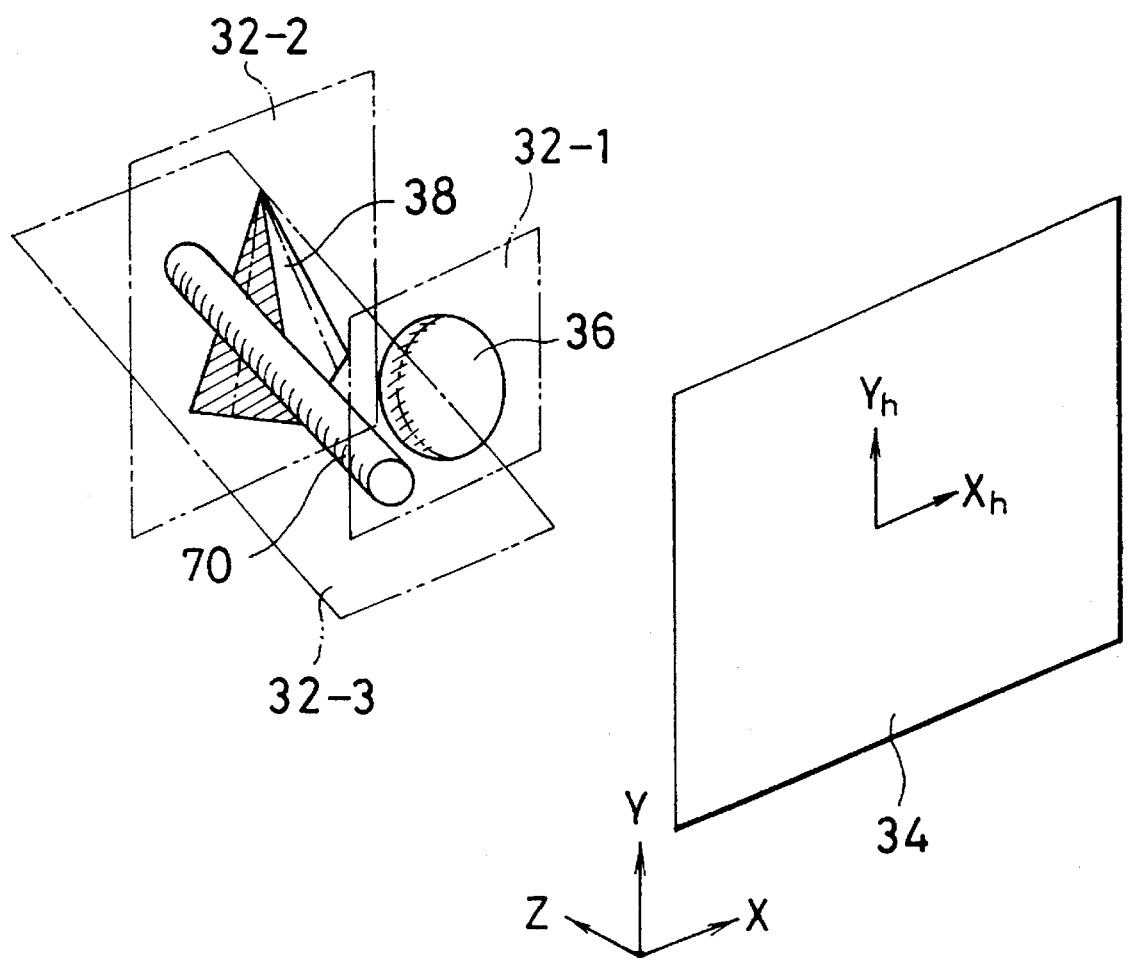
FIG. 19 is an explanatory diagram showing the setting of a virtual screen for an object having a depth structure according to the invention.

FIG. 19 shows another setting method of a virtual screen according to the invention. In the embodiment, in addition to the target 36 of a sphere and the target 38 of a circular cone, a cylindrical body 70 having a structure in the depth direction exists. In this case, with respect to the targets 36 and 38, the virtual screens 32-1 and 32-2 which pass through the centers of gravity and are parallel with the hologram forming surface 34 are set. On the other hand, the virtual screen 32-3 which is inclined in the depth direction along the axial center line is set with regard to the cylindrical body 70 having the depth structure. As mentioned above, with respect to the virtual screen of the invention, the virtual screen surface can be set in an arbitrary direction in accordance with the structure of the target.

Figure 20:
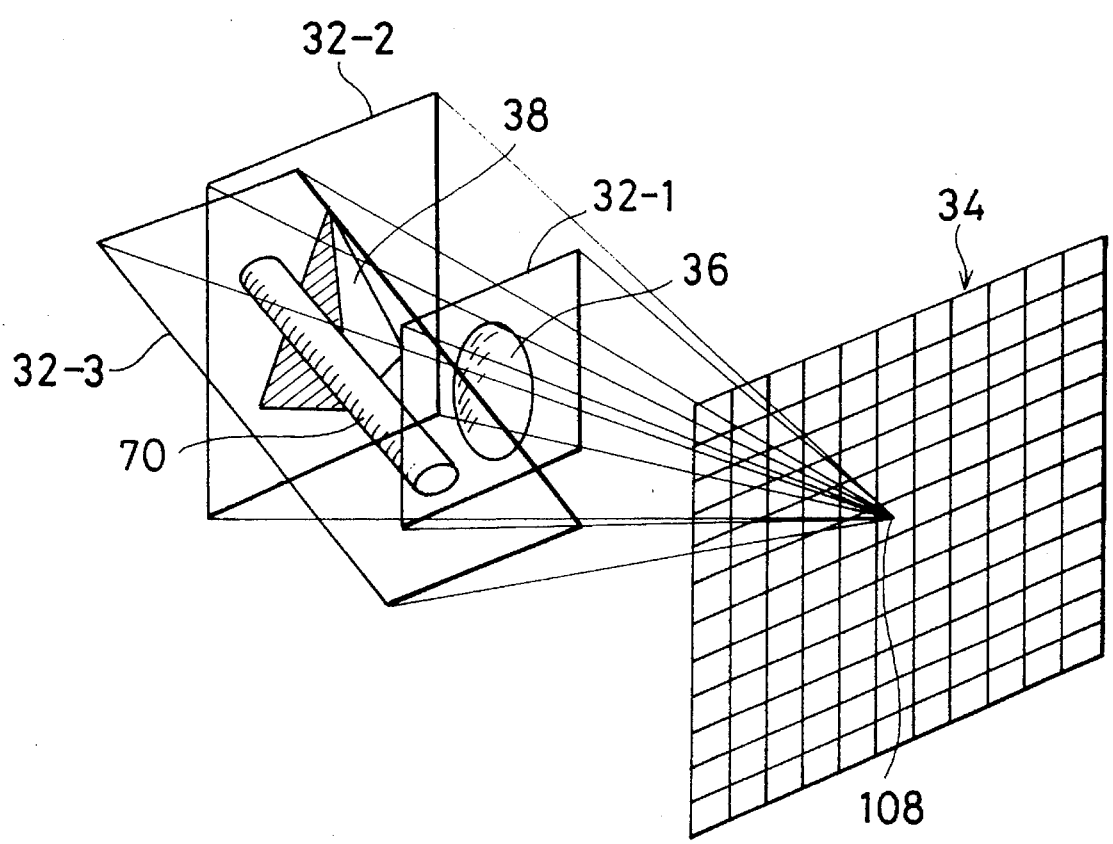
FIG. 20 is an explanatory diagram showing the formation of projection 2-dimensional data of the object having the depth structure shown in FIG. 19.

FIG. 20 shows the formation of 2-dimensional data for the setting of the virtual screens in FIG. 19. As for the cylindrical body 70 having a depth structure, in case of calculating a phase distribution with respect to, for instance, the central hologram segment of the hologram forming surface 34, 2-dimensional projection data when it is radially seen from the hologram segment 108 is produced.

(Calculation of phase distribution)

The principle of the hologram will be first explained. As a hologram, one laser beam is divided into two beams. One of the laser beams is irradiated onto an object and is irradiated by the object, so that a laser beam (object light) is obtained. A hologram is derived by an interference of two light fluxes of the object light and another laser beam (reference light). It is now assumed that a wave front of the reference light is set to $R \cdot \exp(j\phi_r)$ and a wave front of the object light is set to $O \cdot \exp(j\phi_o)$. An exposing intensity $I_H$ of the hologram is $$I_H = R^2 + O^2 + 2 \cdot R \cdot O \cdot \cos(\phi_o - \phi_r) \quad (1)$$

In case of developing the hologram, changes in amplitudes and phases which are proportional to the exposing intensity $I_H$ of the equation (1) occur in the hologram. To electrically form the hologram, a space light modulating device such as a liquid crystal device or the like which can change the amplitude and phase of the light can be used. By inputting the same wave front as that of the reference light to the hologram formed as mentioned above, a hologram can be reproduced. In the exposing intensity $I_H$ of the equation (1), only the third term of the right side contributes to the reproduction of the object light. Therefore, when considering the third term of the right side, a transmission light T from the hologram is as shown by the following equation (2).

$$T = I_H \cdot R \cdot \exp(j\phi) \propto 2 \cdot O \cdot \cos(\phi_o - \phi_r) = O \cdot \exp(j\phi_o) + O \cdot \exp\{-j(\phi_o - 2 \cdot \phi_r)\} \quad (2)$$

The first term of the right side of the equation (2) denotes that the wave front from the object was reproduced. The second term of the right side indicates a conjugate wave of the object light. From the above description of the principle, it will be understood that it is sufficient to calculate only the third term of the right side of the equation (1) in the calculation of a phase distribution of a hologram.

Figure 21:
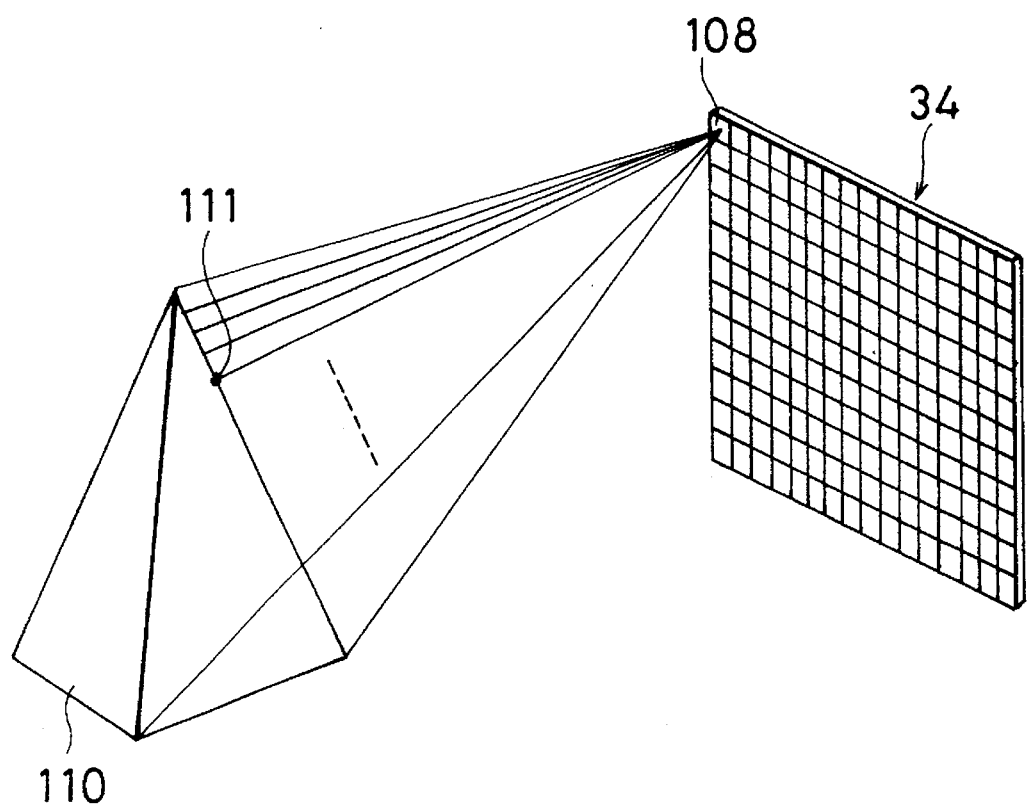
FIG. 21 is an explanatory diagram showing the principle of the calculation of a phase distribution to form a Fresnel type hologram.

FIG. 21 shows the principle of the formation of a Fresnel type hologram. Now, considering that the reference light is constructed by a plane wave, since an intensity of the plane wave doesn't change due to the location, a light intensity R can be ignored and it is possible to regard such that the phase $\phi = 0$. When a luminance (scattering degree) at a certain sampling point 111 having coordinates $(X_i, Y_i, Z_i)$ of an object 110 is set to $I_i$, the exposing intensity $I_H$ of the hologram segment 108 as a minimum unit on the hologram forming surface 34 is $$I_H = \sum_i \{(I_i/r_i) \cdot \cos(k \cdot r_i)\} \quad (3)$$

where, k denotes the number of waves of the laser beam $$r_i = \sqrt{\{(X_i - X_{hi})^2 + (Y_i - Y_{hi})^2 + Z_i^2\}} \quad (4)$$

In case of the Fresnel type hologram shown in FIG. 21, since the light irradiated from the object 110 reaches the whole hologram, it is necessary to execute the calculations of the equations (3) and (4) for the whole region of the hologram forming surface 34. On the other hand, in case of the image type hologram shown in FIG. 22, the image of the object 110 is formed as a real image 114 at the position of the hologram forming surface 34 by an image forming lens 112. Therefore, as shown in FIG. 23, for example, when a sampling point 118 of the real image 114 is seen, the light reaches only the portion in a region 120 of the hologram forming surface 34 which is determined by a virtual opening 116. A region to perform the calculations of the equations (3) and (4) is limited.

(Calculation of phase of hologram having parallaxes in the horizontal and vertical directions)

Figure 24:
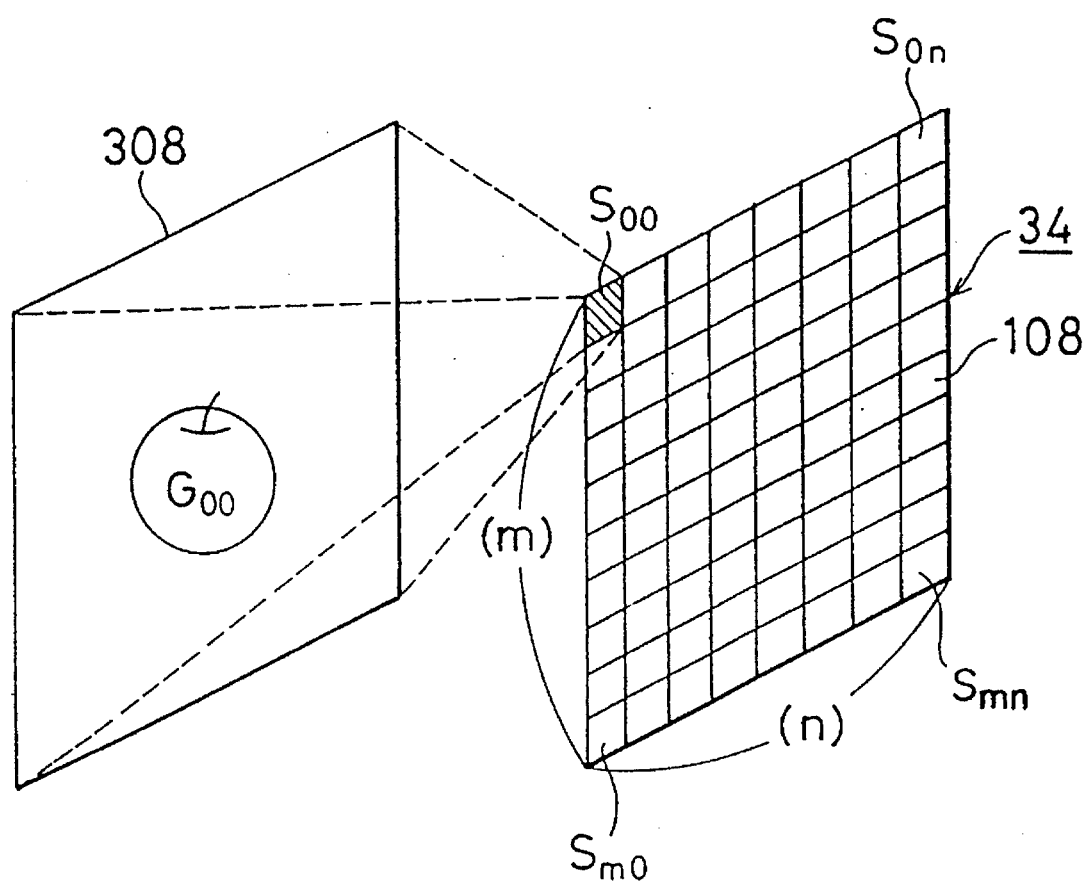
FIG. 24 is an explanatory diagram showing the calculation of a phase distribution of a hologram having parallaxes in both of the horizontal and vertical directions according to the invention.

FIG. 24 shows a state of the phase calculation of the hologram having parallaxes in both of the horizontal and vertical directions based on the 2-dimensional image formed at the position of the virtual screen. The hologram forming surface 34 is divided into (n×m) hologram segments 108 in a matrix form of, for example, n segments in the horizontal direction and m segments in the vertical direction. A region at the left upper corner of the hologram segments 108 on the hologram forming surface 34 assumes $S_{00}$ and a last region at the right lower corner assumes $S_{mn}$. NOW, attention is paid to the hologram segment region $S_{00}$ at the left upper corner. A 2-dimensional image 308 in which the region $S_{00}$ is set to a visual point is set to the virtual screen position as shown in the diagram. The 2-dimensional image 308 corresponding to the virtual hologram region $S_{00}$ is expressed by $G_{00}$. Therefore, prior to the phase calculation of the hologram forming surface 34, 2-dimensional images $G_{00}$ to $G_{mn}$ corresponding to the hologram segment regions $S_{00}$ to $S_{mn}$ are prepared. In the phase calculation of the hologram segment region $S_{00}$, it is sufficient to execute the phase calculations of the equations (3) and (4) with respect to the luminance data of all of the pixels of the corresponding 2-dimensional image $G_{00}$. In a manner similar to the above, with respect to the other remaining hologram segment regions $S_{01}$ to $S_{mn}$, it is sufficient to execute similar phase calculations with regard to the corresponding 2-dimensional images $G_{01}$ to $G_{mn}$ formed by setting those hologram segment regions into the visual point positions, respectively.

(Phase calculation of image hologram)

Figure 25:
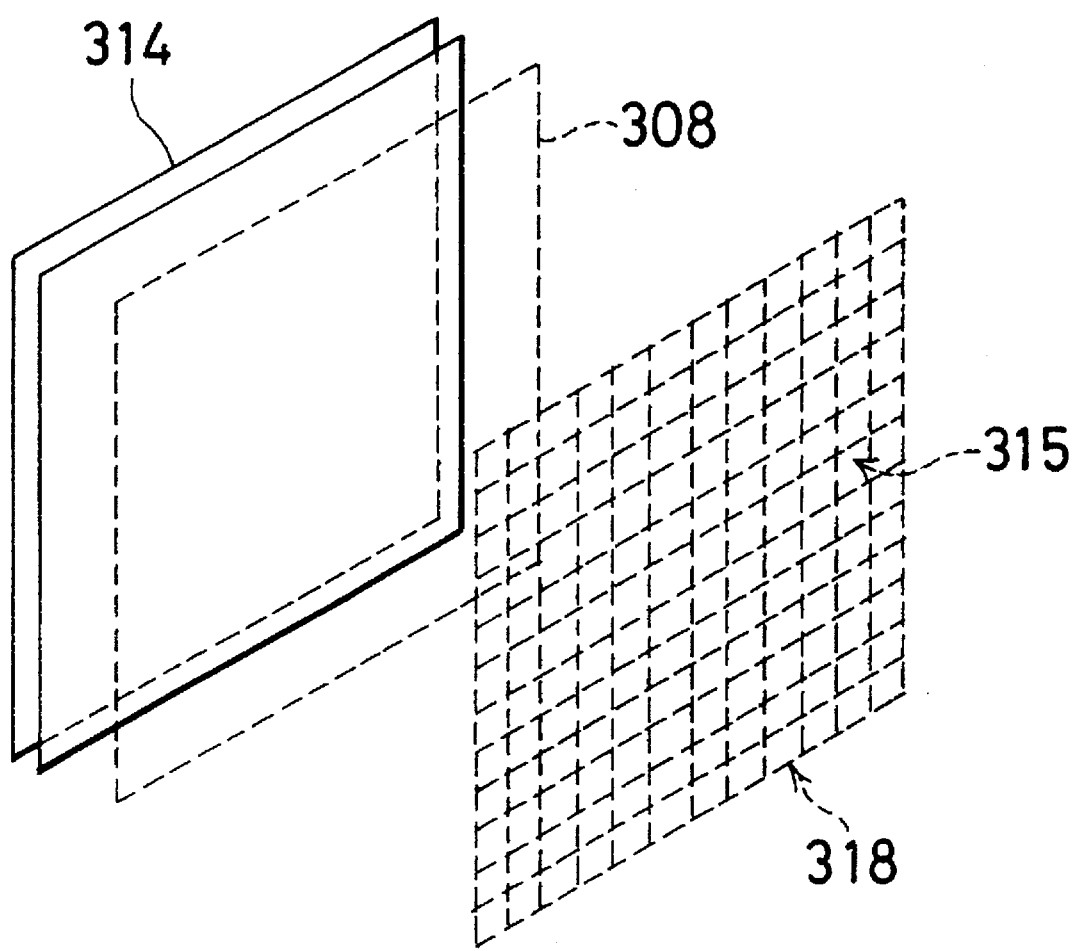
FIG. 25 is an explanatory diagram showing the calculation of a phase distribution of an image hologram according to the invention.

FIG. 25 shows a state of phase calculation of the image hologram based on the 2-dimensional image formed on the set virtual screen. A virtual holographic stereogram 318 corresponds to the hologram forming surface 34 shown in FIG. 24 and has a virtual opening 315 corresponding to the hologram segment 108. Therefore, the virtual holographic stereogram 318 is constructed by matrix regions in a range from the virtual opening region $S_{00}$ at the left upper corner to the last virtual opening region $S_{mn}$ at the right lower corner. The 2-dimensional image 308 is set at the virtual screen set position for the virtual holographic stereogram 318. Similar to the hologram forming surface 34 in FIG. 24, as for the 2-dimensional image 308, the 2-dimensional images $G_{00}$ to $G_{mn}$ have been prepared in correspondence to the virtual opening regions $S_{00}$ to $S_{mn}$. An image hologram forming surface 314 as a target for the phase calculation is arranged at a position near the 2-dimensional image 308.

Figure 26:
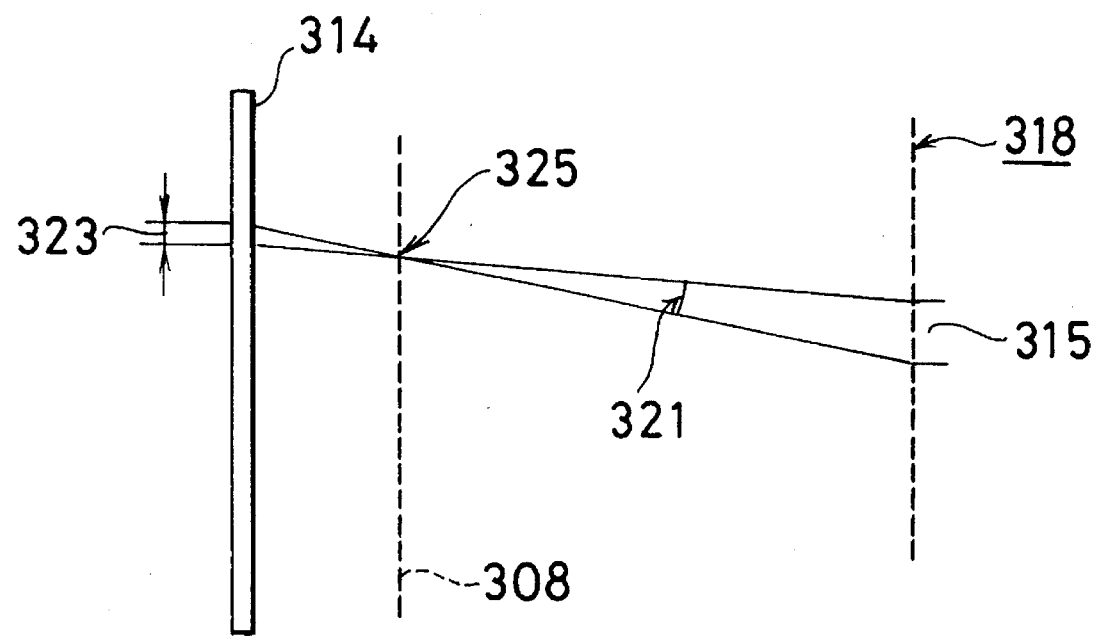
FIG. 26 is an explanatory diagram of a calculating region in the image hologram in FIG. 25.

The calculation of the phase distribution for the image hologram forming surface 314 is executed in a region shown in FIG. 26. When it is now assumed that the 2-dimensional image 308 corresponding to the virtual opening 315 of the virtual holographic stereogram 318 was set, the light beam which arrives at the image hologram forming surface 314 from the 2-dimensional image 308 is a light beam which passes through the virtual opening 315. Therefore, a light flux arriving region 323 of the image hologram forming surface 314 which is determined by the extent of the light flux due to the virtual opening 315 is obtained with respect to a pixel 325 of the 2-dimensional image 308. A phase distribution is calculated with regard to the light flux arriving region 323. In a manner similar to the above, a light flux arriving region due to the virtual opening is likewise obtained every pixel of the 2-dimensional image 308 and a phase distribution is calculated for the light flux arriving region. After completion of the phase calculation for the image hologram forming surface 314 of the 2-dimensional image 308 corresponding to one virtual opening as mentioned above, similar phase calculations are executed with respect to the 2-dimensional image 308 corresponding to all of the other remaining virtual openings. A phase distribution of the image hologram forming surface 314 is derived as a sum of the phase distributions obtained by all of the phase calculations.

(Phase calculation of hologram having parallax in the horizontal direction)

Figure 27:
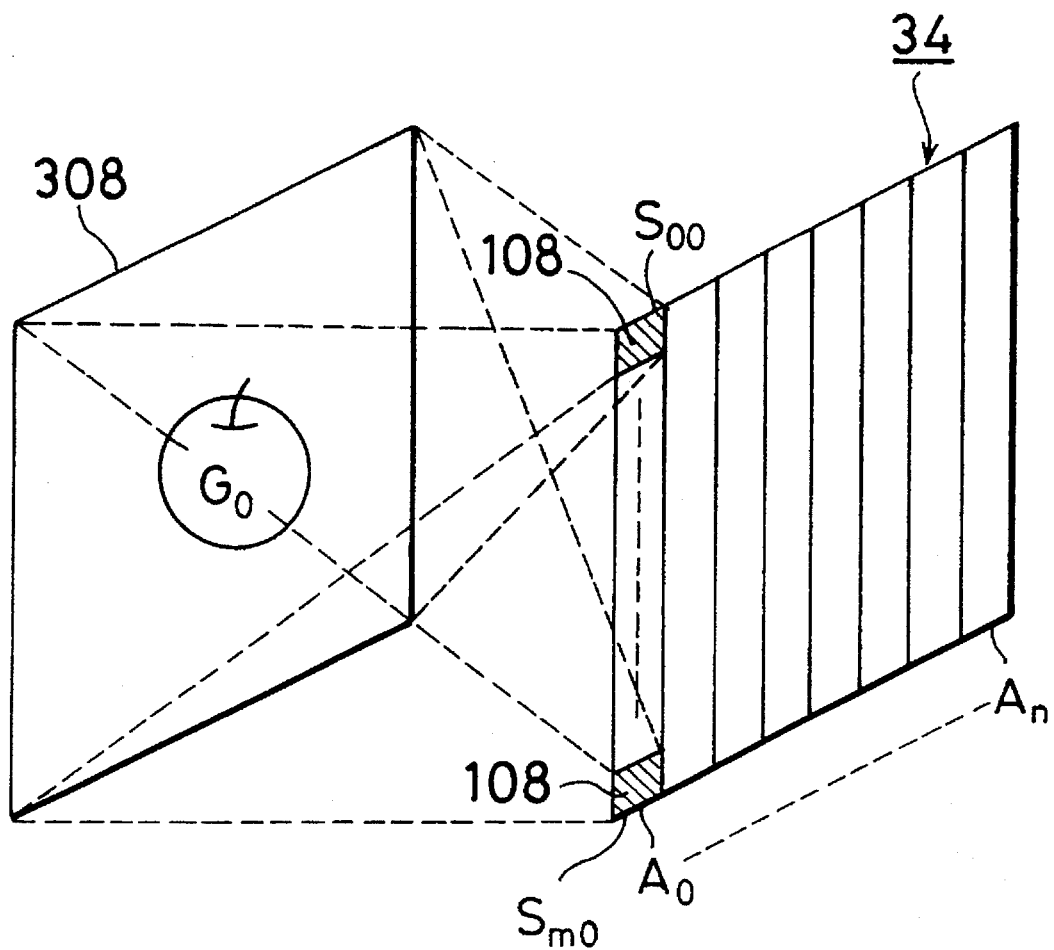
FIG. 27 is an explanatory diagram showing the calculation of a phase distribution of a hologram having a parallax in the horizontal direction according to the invention.

FIG. 27 shows the calculation of a phase calculation of a hologram having a parallax in only the horizontal direction. The hologram forming surface 34 is divided in the horizontal direction, thereby forming stripe regions $A_0$ to $A_n$ which are long in the vertical direction. As a 2-dimensional image 308, 2-dimensional images $G_O$ to $G_n$ when they are seen by setting different positions in the horizontal directions of the stripe regions $A_0$ to $A_n$ into visual points have been prepared. In case of calculating a phase distribution of the stripe region $A_0$ at the left edge of the hologram forming surface 34, the stripe region $A_0$ is set to the visual point position in the horizontal direction and the 2-dimensional image $G_0$ formed on the virtual screen is previously set. Similar to the hologram forming surface 34 shown in FIG. 24, the stripe region $A_0$ is divided into m hologram segments 108 in the vertical direction. Therefore, with respect to all of the hologram segment regions $S_{00}$ to $S_{m0}$, the phase distributions are calculated by the equations (3) and (4) for the same 2-dimensional image $G_0$ as a target. After the phase distribution regarding the stripe region $A_0$ was calculated, the other remaining regions $A_1$ to $A_n$ are set and phase calculations are likewise performed.

In the calculations of the phase distributions for the stripe regions $A_0$ to $A_n$, when the 2-dimensional image is projected from the 3-dimensional image to the virtual screen surface, the visual point position in the horizontal direction is changed while keeping the eyes to the 3-dimensional image into the horizontal state at different positions in the horizontal direction of the stripe regions $A_0$ to $A_n$ or the visual point position is changed so as to be always directed to one point of the object, thereby setting the display surface of the 2-dimensional image 308 to different positions.

Figure 28:
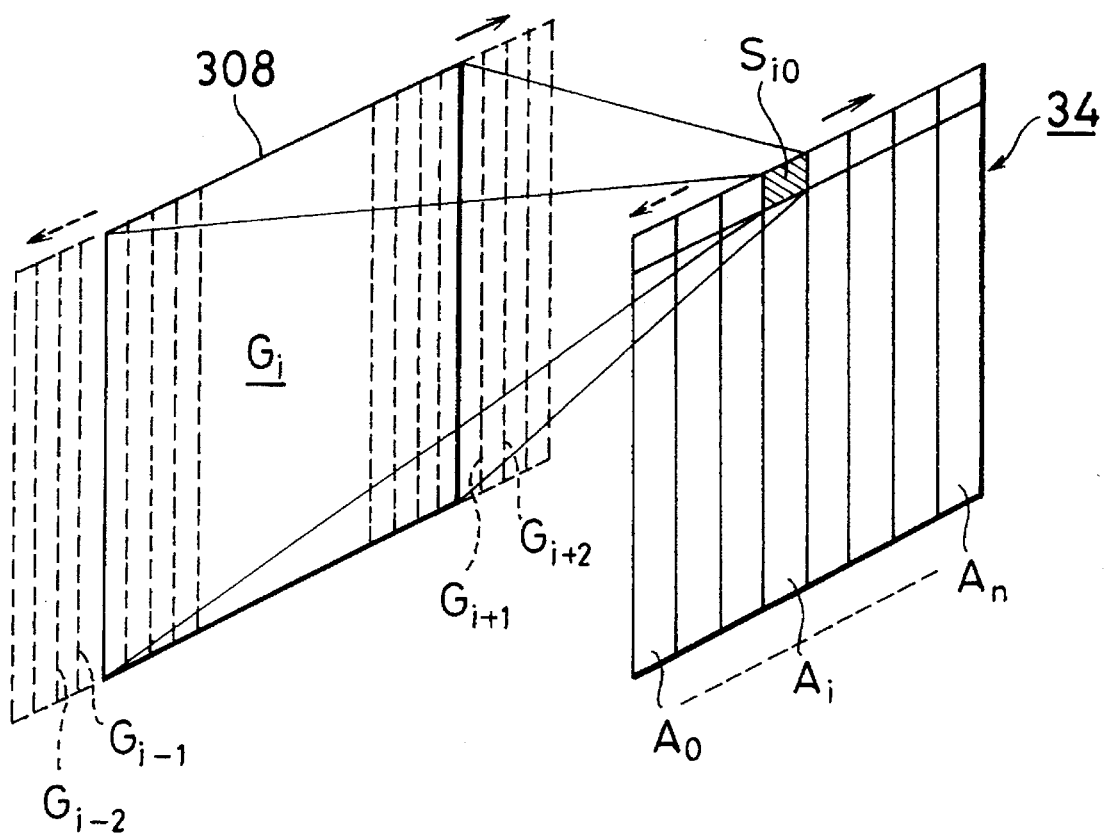
FIG. 28 is an explanatory diagram of the calculation of a phase distribution of a hologram in the case where an optical axis is parallel with a change in position of a visual point in FIG. 27.

FIG. 28 shows a state of the calculation of a phase distribution in the case where the direction of the eyes to see a target was moved in the horizontal direction and the visual point position was changed. The 2-dimensional image 308 having an image content $G_i$ corresponding to the stripe region $A_i$ locating near the center is now shown by a frame surrounded by a solid line. With respect to the stripe region $A_{i-1}$ which is located on the left side by one region from the stripe region $A_i$, when the size of 2-dimensional image 308 is set to the same size, a 2-dimensional image $G_{i-1}$, shown by a broken line that is deviated to the left side by one image is derived. With regard to the stripe region $A_{i+1}$ that is deviated to the right side by one region from the stripe region $A_1$, a 2-dimensional image $G_{i+1}$ shown by a broken line that is likewise deviated to the right side by one image is derived.

Figure 29:
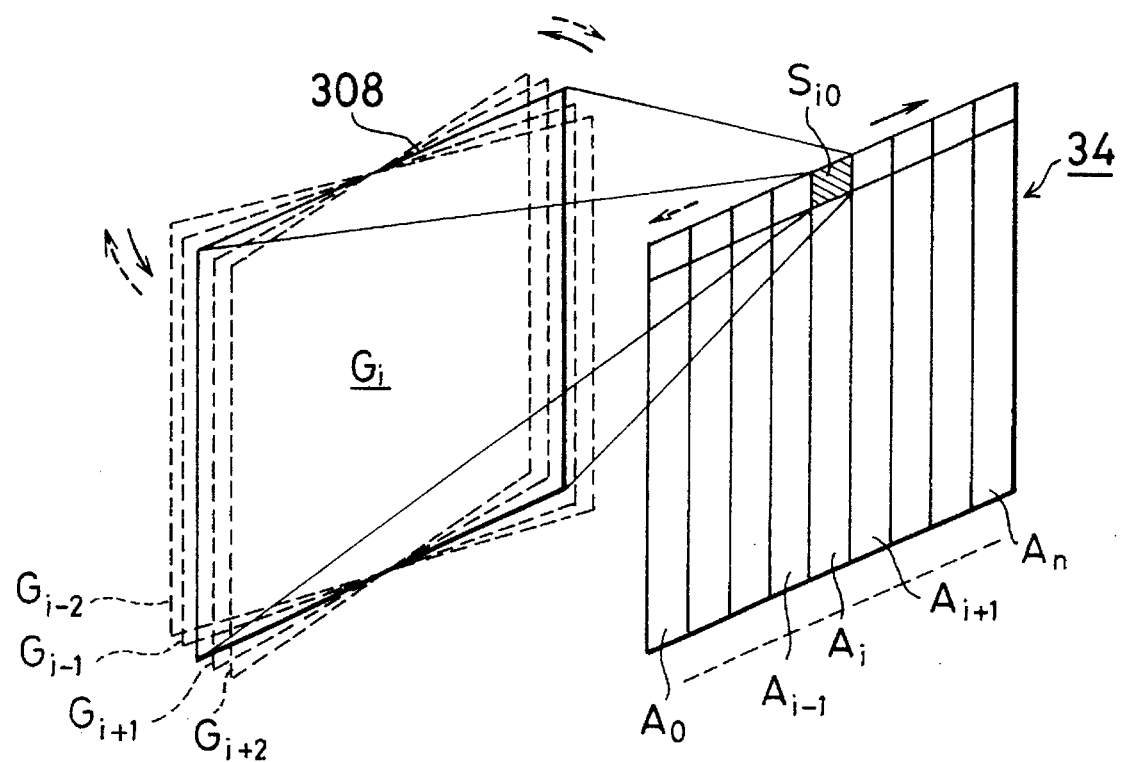
FIG. 29 is an explanatory diagram of the calculation of a phase distribution of a hologram in the case where the optical axis is directed to one point of an object in response to a change in position of the visual point in FIG. 27.

On the other hand, FIG. 29 shows the case where the direction of the eyes was set so as to be always directed to one point of a target at different positions corresponding to the stripe regions $A_0$ to $A_n$ in the horizontal direction. In this case, when it is assumed that the 2-dimensional image 308 corresponding to the stripe region $A_i$ located near the center is expressed by $G_i$ shown by a frame surrounded by a solid line, with respect to the stripe region $A_{i-1}$ that is deviated to the left side by one region, a 2-dimensional image $G_{i-1}$ that is clockwise deviated by one image is derived. With regard to the stripe region $A_{i+1}$ that is deviated to the right side by one region from the stripe region $A_i$, a 2-dimensional image $G_{i+1}$ that is counterclockwise deviated by one image is derived. That is, the plane of the 2-dimensional image 308 is set to the rotated position in response to a change in visual point position in the horizontal direction. The position of the pixel data of the 2-dimensional image is set in accordance with the motion of the plane of the 2-dimensional image. A phase distribution of the stripe region corresponding to the 2-dimensional image which is sequentially rotated is calculated.

As for the calculation of the phase distribution of the hologram having the parallax in only the horizontal direction shown in the FIG. 27, in case of calculating the phase distribution of the image hologram, there is only a different point such that the virtual opening 315 of the virtual holographic stereogram 318 shown in FIGS. 25 and 26 is set to a virtual stripe opening which has been divided in the horizontal direction and is long in the vertical direction, as shown in the hologram forming surface 34 in FIG. 27. It is sufficient that a light flux arriving region at the image hologram forming surface is obtained with respect to each pixel of the 2-dimensional image corresponding to each virtual stripe opening and a phase distribution is calculated from the corresponding pixel with regard to the light flux arriving region.

(Phase calculation of hologram by the division of 2-dimensional image)

Figure 30:
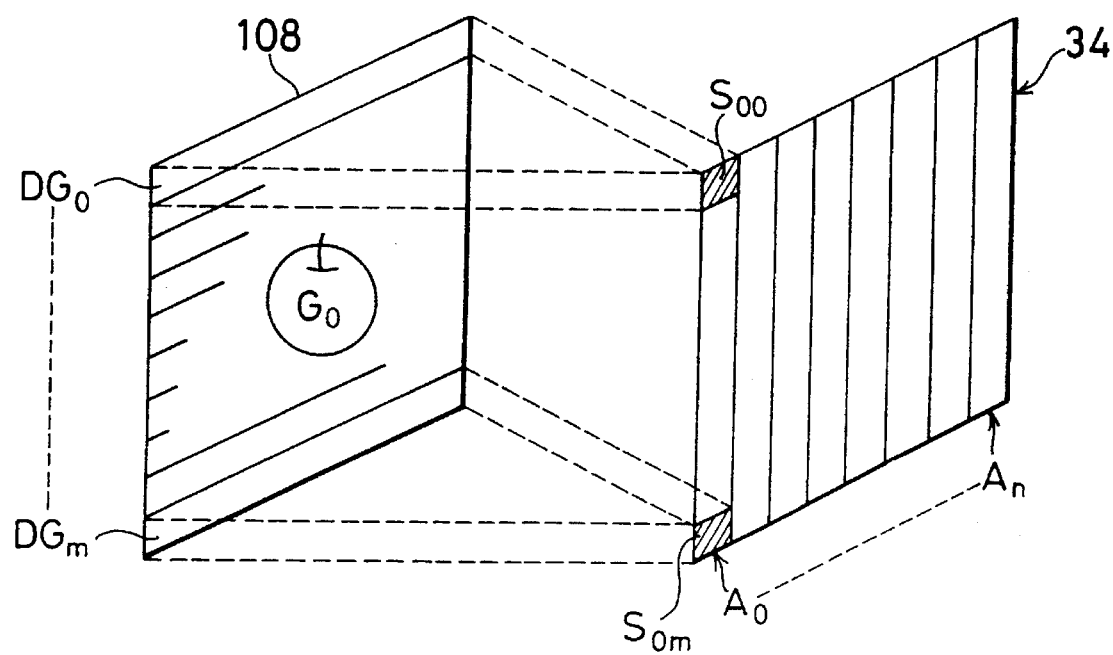
FIG. 30 is an explanatory diagram of the calculation of a phase distribution of a hologram by divided 2-dimensional images.

FIG. 30 shows a state of the calculation of a phase distribution of a hologram having a parallax in only the horizontal direction that is calculated from the divided 2-dimensional images. The hologram forming surface 34 is constructed by stripe regions $A_0$ to $A_n$ which are divided in the horizontal direction and are long in the vertical direction. On the other hand, the 2-dimensional image 108 is constructed by divisional regions $DG_0$ to $DG_m$ which are divided in the vertical direction and are long in the horizontal direction. As a 2-dimensional image 108, the 2-dimensional image $G_0$ obtained by setting the stripe region $A_0$ at the left lower corner of the hologram forming surface 34 into the visual point position in the horizontal direction is set. The 2-dimensional image $G_0$ is divided into the divisional regions $DG_0$ to $DG_{nm}$ and it is assumed that those divisional regions correspond to the hologram segment regions $S_{00}$ to $S_{0m}$ in the vertical direction of the hologram forming surface 34. In this case, a phase distribution is calculated from only the pixel of the corresponding divisional region $DG_0$ with respect to the hologram segment region $S_{00}$. With respect to the other remaining hologram segment regions $S_{01}$ to $S_{01}$, phase distributions are calculated for every corresponding divisional region $DG_1$ to $DG_m$ of the 2-dimensional image $G_0$. By dividing the 2-dimensional image into the regions which are long in the horizontal direction as mentioned above, an a number of calculations of the phase distribution in one of the hologram segment regions $S_{ij}$ (where, i=0 to n, j=0 to m) on the hologram forming surface 34 can be reduced.

With respect to the phase calculations of the image hologram about the divided 2-dimensional images shown in FIG. 30, the phase distributions in the light flux arriving range corresponding to the virtual opening are for every divisional region $DG_0$ to $DG_m$ of the 2-dimensional image 108. For example, in the case where the top hologram segment region $S_{00}$ of the stripe region $A_0$ is set to the virtual opening, a light flux arriving region in which the light beam passes through the virtual opening corresponding to the region $S_{00}$ and reaches the image hologram forming surface is obtained with respect to each of the pixels constructing the divisional region $DG_0$ of the corresponding 2-dimensional image 108. It is sufficient to calculate a phase distribution of the corresponding pixel with respect to such a light flux arriving region.

Figure 31:
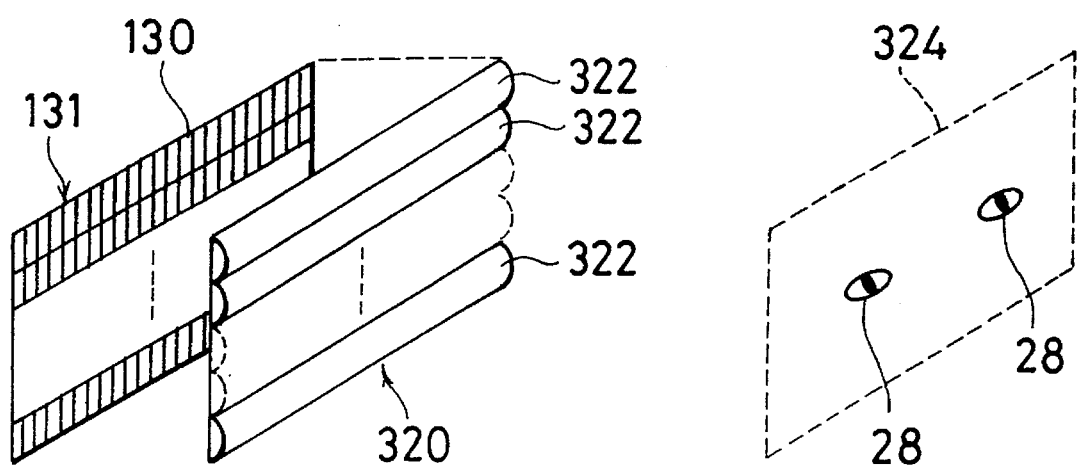
FIG. 31 is an explanatory diagram of the stereoscopic display according to a phase distribution of an image hologram calculated from the divided 2-dimensional images.

With regard to the phase distribution of the image hologram which is formed from the divided 2-dimensional images in FIG. 30, in the case where the calculating condition for allowing the reference light to perpendicularly enter the hologram is set upon setting of the reference light in the calculation of the phase distribution of the image hologram, the phase distribution in the image hologram is constructed by the component in only the horizontal direction, it is necessary to optically enlarge a solid image in the vertical direction upon reproduction of the solid image. As shown in FIG. 31, therefore, in the case where the phase distribution component in only the horizontal direction is expressed by a space light modulating apparatus 130 and a solid image is displayed, a Lenticular sheet 320 in which cylindrical lenses 322 are arranged in the vertical direction, for example, is provided at a position in front of the space light modulating apparatus 130 as an optical device having a visual field enlarging function in the vertical direction. Due to this, for the wave front conversion of the reproduction light due to the hologram phase distribution in only the horizontal direction expressed in the space light modulating apparatus 130, a field of vision 324 which was diffused in the vertical direction by the Lenticular sheet 320 and has an enough width also in the vertical direction is produced.

(Reduction in amount of phase calculations)

Figure 32:
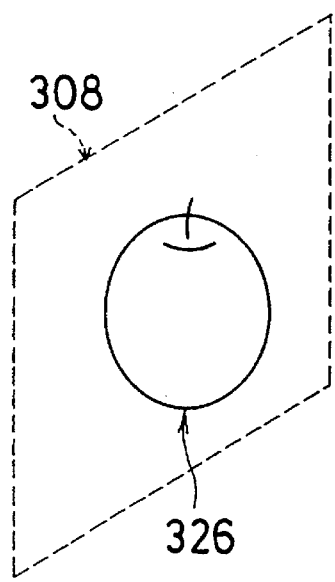
FIG. 32 is an explanatory diagram for reducing a number of calculations by calculating a phase distribution in only an image region.

FIG. 32 shows a hologram according to the invention and a method for reducing an number of calculations for a phase distribution in an image hologram. In this case, a region 326 including the image in the 2-dimensional image 308 is set to pixel data which is used for the phase calculation and the pixels in the region where no image exists are eliminated from a target for phase calculation, so that the calculation amount can be reduced.

Figure 33:
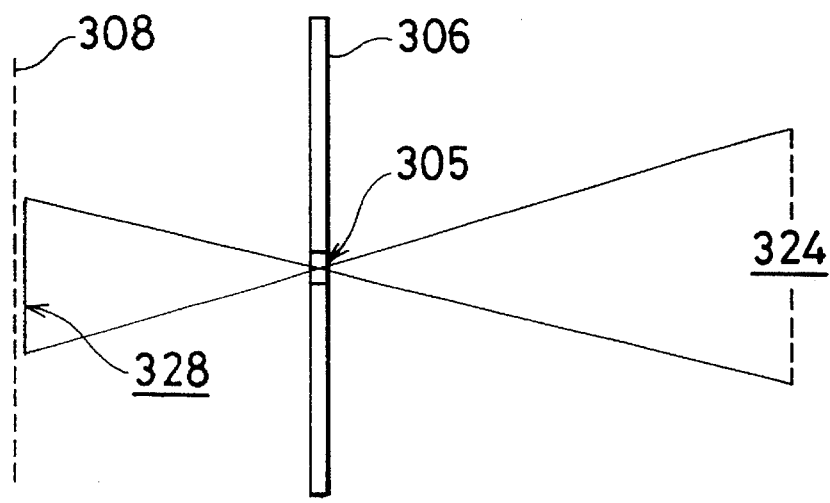
FIG. 33 is an explanatory diagram for reducing a number of calculations by calculating a phase distribution in only the image region corresponding to a field of vision.

FIG. 33 shows a method for reducing a calculation amount in the phase calculation of a hologram having parallaxes in both of the horizontal and vertical directions shown in FIG. 24. It is now assumed that the visual field 324 has been determined for a hologram 306. When a central hologram segment 305 shown in the diagram will now be considered as an example, a phase distribution of the hologram segment 305 is calculated by using only the pixels in the display region of the 2-dimensional image 308 that is determined by the visual field 324. By limiting the region of the 2-dimensional image which is used for the calculations of the phase distribution in dependence on the visual field, a calculation amount can be remarkably reduced.

(Display of solid image)

Figure 34:
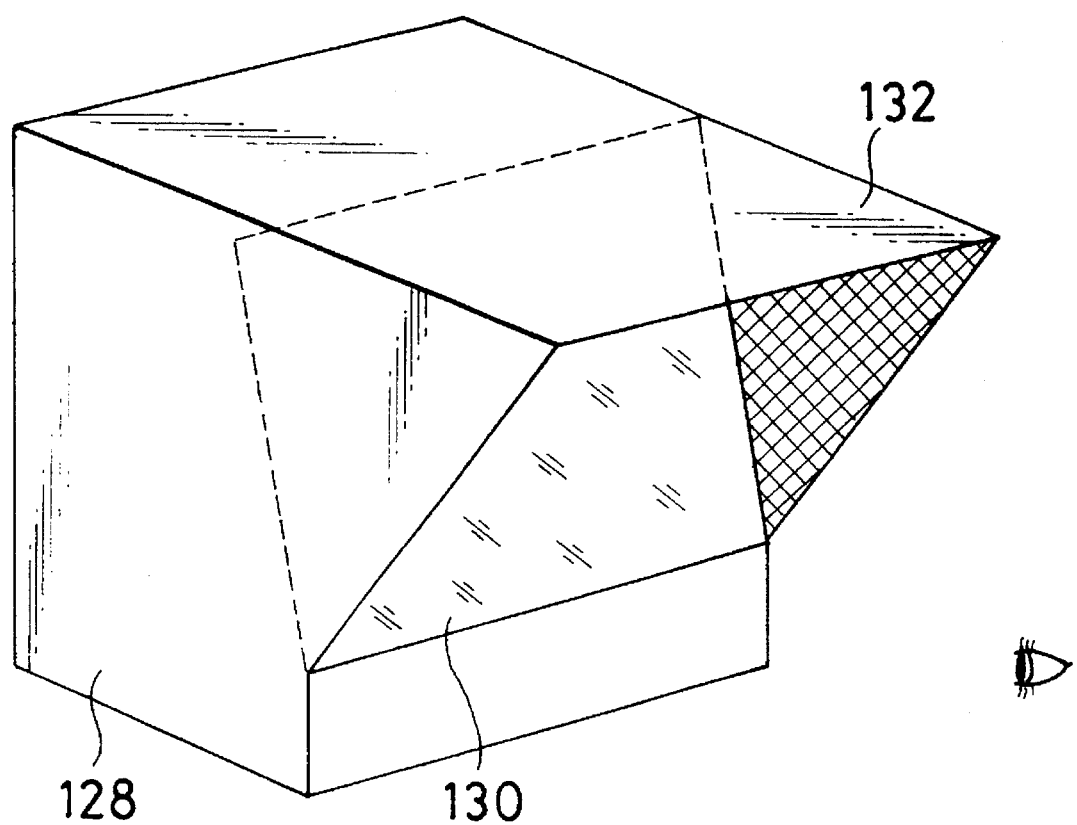
FIG. 34 is an explanatory diagram showing an embodiment of a stereoscopic display apparatus of the invention.
Figure 35:
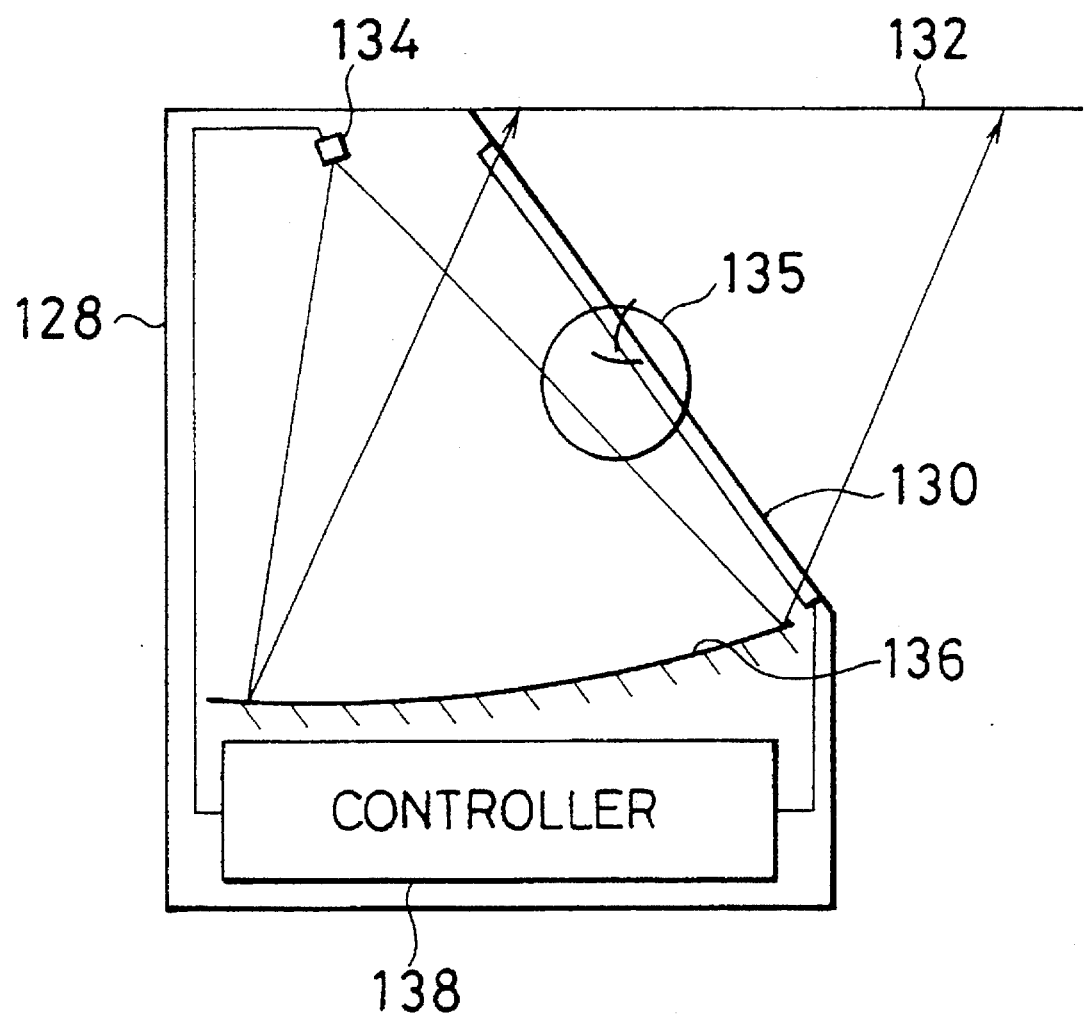
FIG. 35 is an explanatory diagram showing an internal structure of FIG. 34.

FIG. 34 shows an external view of a hologram display apparatus for expressing a phase distribution obtained by calculations and for displaying a solid image by irradiating a reference light. The space light modulating apparatus 130 to electrically form a hologram is provided in front of an apparatus main body 128. A hood 132 is also provided to shield the 0th order light which transmits through the space light modulating apparatus 130. FIG. 35 shows an internal structure of FIG. 34. A laser light source 134 which functions as a point light source, a collimating mirror 136, and a controller 138 are built in the apparatus main body. The controller 138 gives the phase distribution obtained by the calculation to the space light modulating apparatus 130. In this state, a spherical wave irradiated as a point light source from the laser light source 134 is converted into a parallel light by the reflecting type collimating mirror 136 and is irradiated to the space light modulating apparatus 130, thereby reconstructing a solid image 135. In this case, since a part of the parallel light directly passes through the space light modulating apparatus 130 as a 0th order light, such a light is shielded by the hood 132.

Although an arbitrary laser light source can be used as a laser light source 134, it is desirable to use a small semiconductor laser. The semiconductor laser has a light emitting spectrum whose wavelength is equal to or less than a few nm and can reconstruct a clear solid image. An arbitrary wavelength can be used as a wavelength which is used so long as it lies within a range of the visible light. It is, however, necessary to consider a wavelength of light source which is used upon reconstruction at the stage of calculating a phase distribution of the hologram. Specifically speaking, it is possible to use a semiconductor laser which can emit a red light whose wavelength is on the order of 600 nm, a green light whose wavelength is on the order of 500 nm, or a blue light whose wavelength is on the order of 400 nm. In case of a Fresnel type hologram such that the object 110 is away from the hologram forming surface 34 as shown in FIG. 21, as the distance increases, the hologram is more easily influenced by the color distribution due to the wavelength width of the reproduction light. It is, accordingly, desirable to use a semiconductor laser having a narrow wavelength band.

Figure 22:
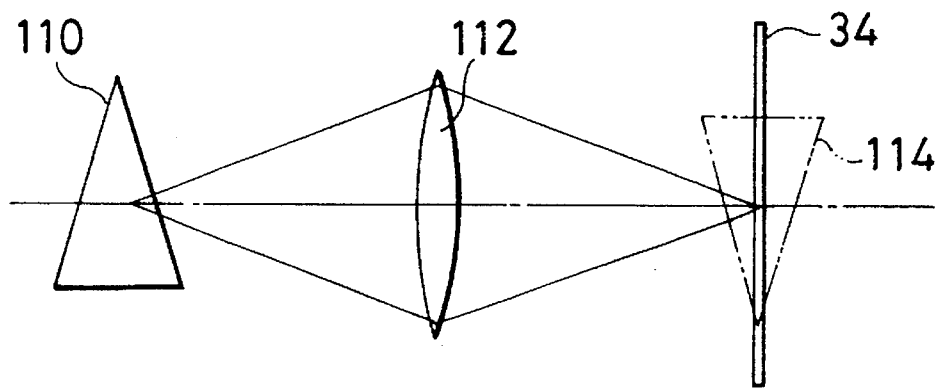
FIG. 22 is an explanatory diagram showing the principle to form an image type hologram.
Figure 23:
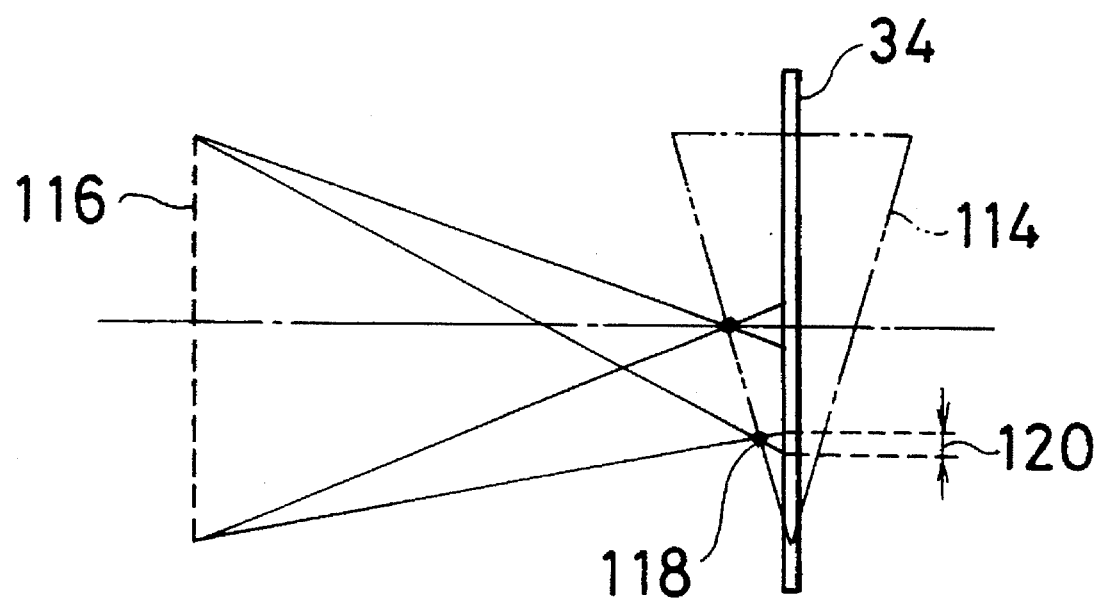
FIG. 23 is an explanatory diagram showing a calculating range of a phase distribution in the formation of the image type hologram.

On the other hand, in case of an image type hologram such that the object 114 is located near the hologram forming surface 34 as shown in FIG. 22, the hologram is hardly influenced by the color distribution due to the wavelength width of the reproduction light. Therefore, a clear reproduction image can be obtained even when a wavelength width is slightly wide. In case of the image type hologram, therefore, a halogen lamp or the like whose wavelength is about 10 nm can also be used. Although the spherical wave is directly emitted from the laser light source 134 in FIG. 35, it is also possible to construct in a manner such that a laser beam is generated by an objective lens and a pin hole or that a laser beam is transmitted in an optical fiber and is emitted upon outgoing.

Figure 36:
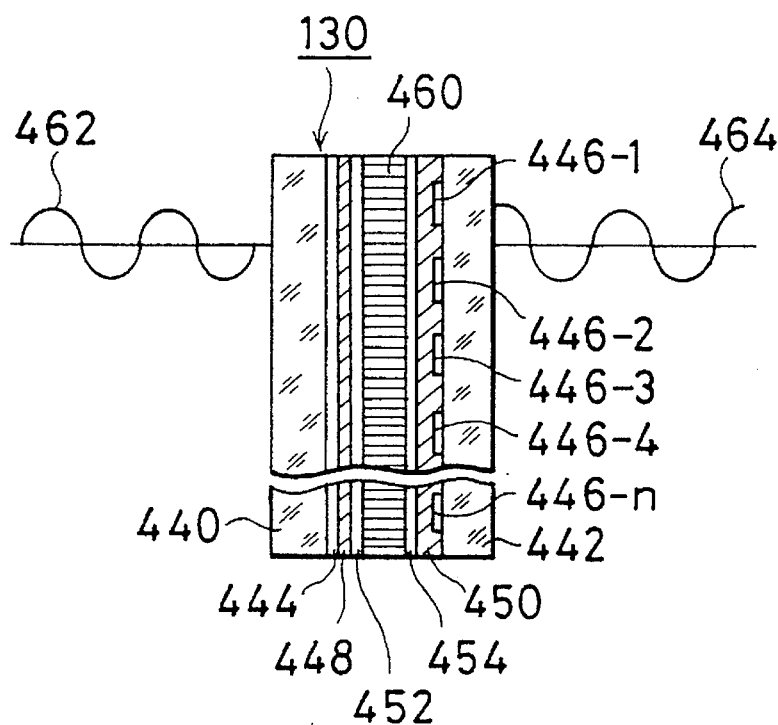
FIG. 36 is an explanatory diagram of a structure of a liquid crystal display which is used as a space light modulating apparatus in the invention.

FIG. 36 shows an embodiment of the space light modulating apparatus 130 which is used in the invention. A liquid crystal display is used as a space light modulating apparatus 130 in the embodiment. That is, a uniform transparent electrode 444 is provided subsequent to a glass substrate 440 on the incident surface side. Branched transparent electrodes 446-1 to 446-n constructing one display segment are formed subsequent to a glass substrate 442 on the outgoing side. Orientation films 452 and 454 are provided subsequent to the transparent electrodes 444 and 446-1 to 446-n through insulating layers 448 and 450. A liquid crystal 460 is provided between the orientation films 452 and 454. The liquid crystal display is driven so that a voltage corresponding to the calculated phase information is applied for each of the liquid crystal cells which are determined by the divisional electrodes 446-1 to 446-n. A refractive index of the liquid crystal cell for the transmitting direction of a reproduction light 462 is changed in accordance with the voltage applied.

Figure 37:
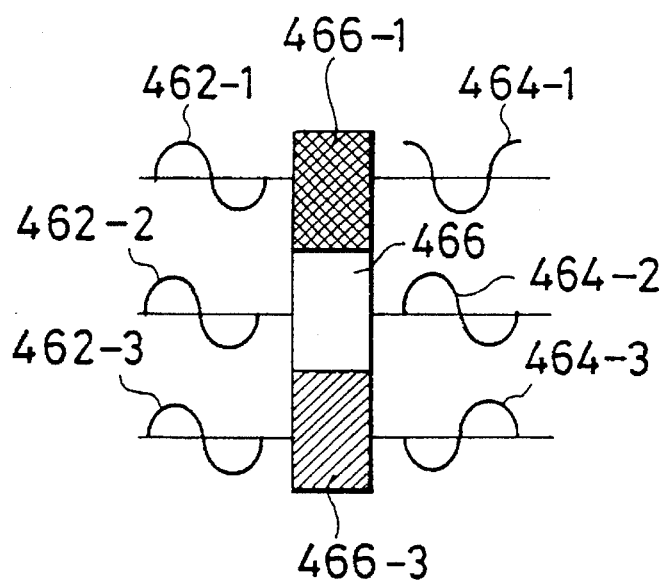
FIG. 37 is an explanatory diagram showing a phase modulation for a reproduction light with respect to three of liquid crystal cells in FIG. 36.

FIG. 37 shows a state of phase modulation with respect to three of the pixels of the liquid crystal display as an example. Namely, when reproduction lights 462-1 to 462-3 having the same phase comprising, for example, plane waves enter from the left side into pixels 466-1 to 466-3 which were driven in different phase states, namely, at different refractive indices, phase deviations occur in lights 464-1 to 464-3 upon outgoing because the optical distances in the liquid crystal are different in dependence on the pixels 466-1 to 466-3. Ideally, it is desirable that an arbitrary phase can be expressed in a range from 0 to 2π, that is, in a range of the length of the wavelength as an optical distance. However, even when the phase is discretely expressed by multivalue levels, a phase distribution can be approximately expressed in a practical range. A thickness d of liquid crystal is determined so as to satisfy the condition such that the product Δn×d between the thickness d and a change Δn in maximum refractive index which can be changed by the applied voltage is equal to a wavelength λ of the reproduction light. To accurately express the phase distribution and to obtain a clear reproduction solid image, it is necessary to minimize the liquid crystal cell to a size on the order of the wavelength and to use a liquid crystal display having a high resolution.

Figure 38:
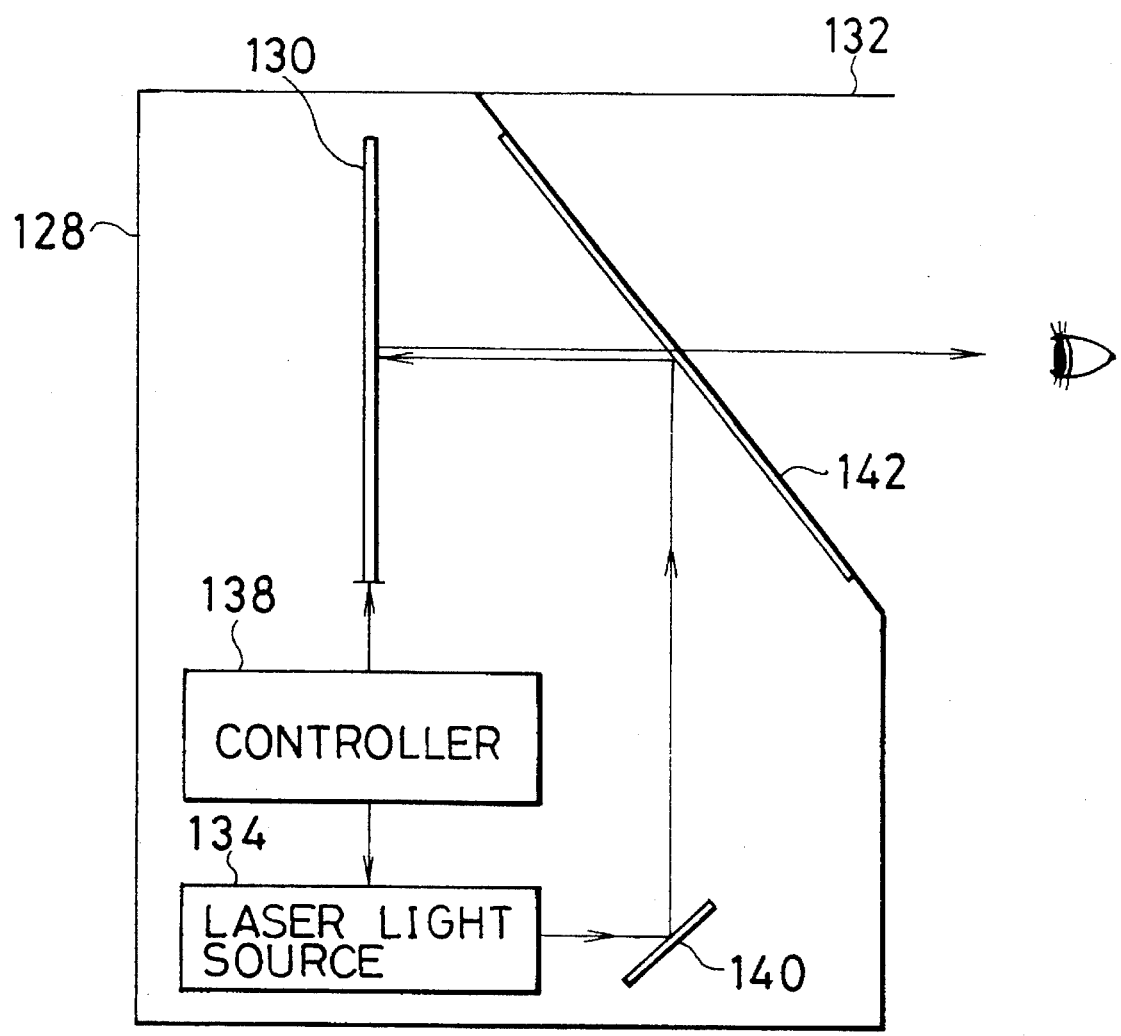
FIG. 38 is an explanatory diagram of another stereoscopic display apparatus of the invention using a space light modulating apparatus of the reflecting type.

FIG. 38 shows another embodiment of a stereoscopic display apparatus of the invention and is characterized in that a reflecting type space light modulating apparatus is used. The reflecting type space light modulating apparatus 130 is provided in the apparatus main body 128, thereby electronically expressing a hologram of the phase distribution calculated by the controller 138. A reproduction light from the laser light source 134 is reflected by a mirror 140 and is further reflected by a half mirror 142 and enters the reflecting type space light modulating apparatus 130. The modulation light from the modulating apparatus 130 passes through the half mirror 142, thereby displaying a solid image.

Figure 39:
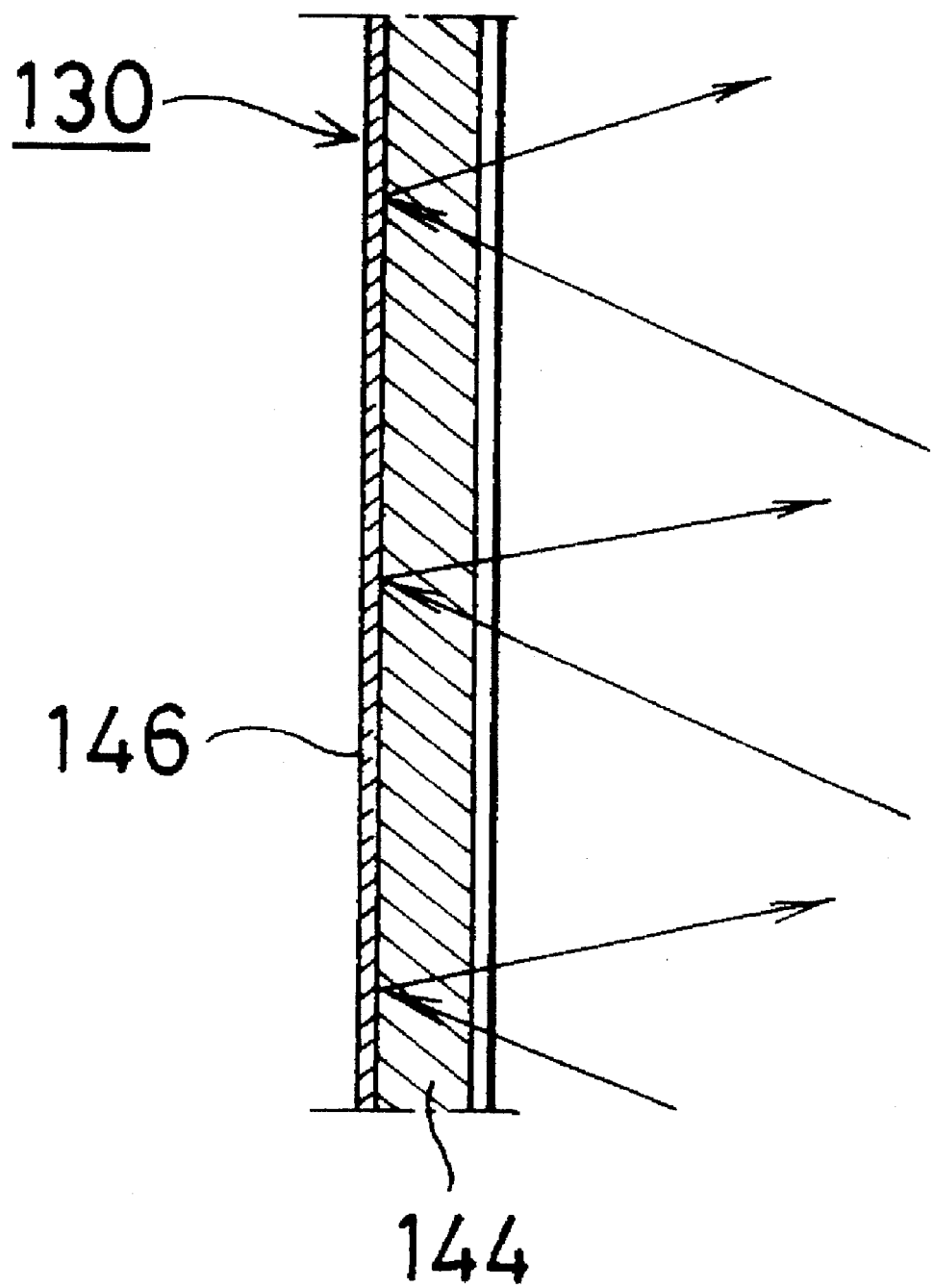
FIG. 39 is an explanatory diagram of the reflecting type space light modulating apparatus which is used in FIG. 38.

As shown in FIG. 39, in the reflecting type space light modulating apparatus 130, the reproduction light is inputted from one side of the transmitting type liquid crystal display 144 and is reflected by a reflecting surface 146 on the opposite side and again passes in the display 144 and goes out. Since the reproduction light passes twice in the transmitting type liquid crystal display 144, as compared with the transmitting type liquid crystal display shown in FIG. 36, the thickness of liquid crystal to obtain a phase change can be reduced by ½. In this instance, however, a liquid crystal of the homogeneous orientation such that the polarization is preserved is used.

Figure 40:
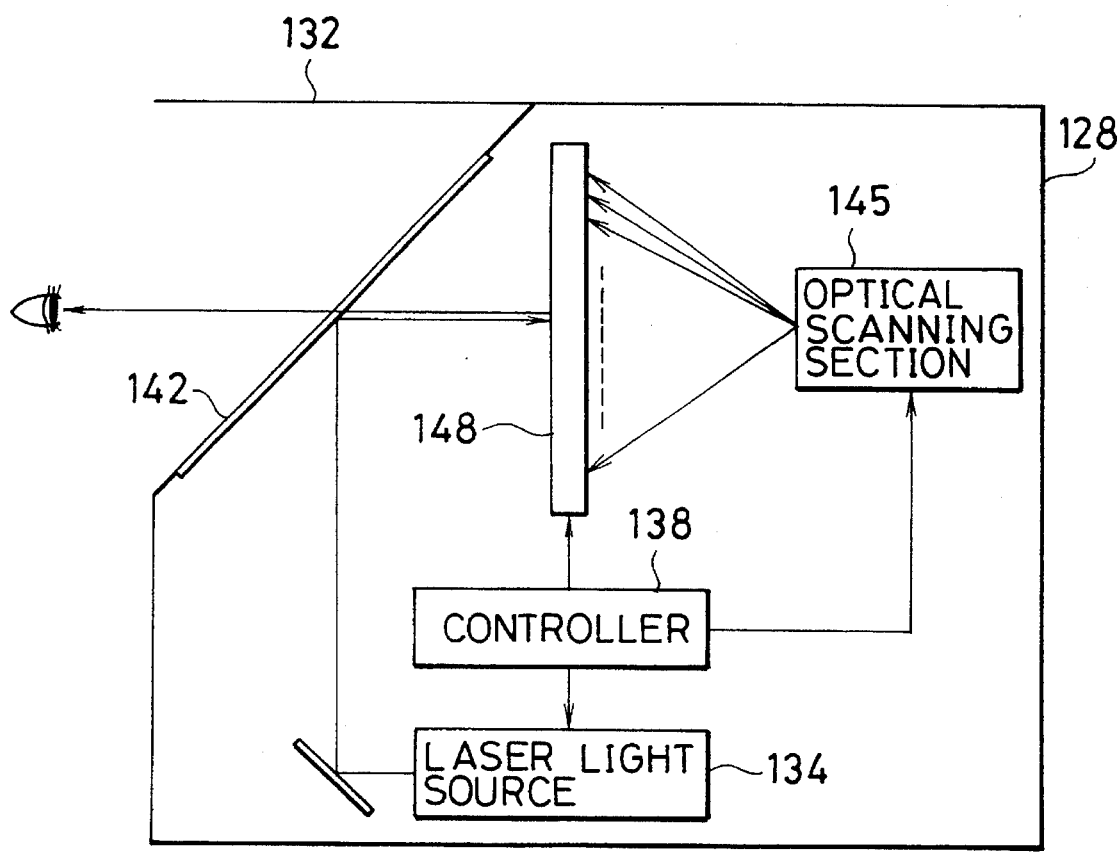
FIG. 40 is an explanatory diagram of a stereoscopic display apparatus of the invention using a space light modulating apparatus of the optical writing type.

FIG. 40 shows another embodiment of a stereoscopic display apparatus of the invention and is characterized in that the information of the calculated phase distribution is optically written and reproduced. A space light modulating apparatus 148 which can optically write phase distribution information by a laser beam from a light scanning section 145 is provided in the apparatus main body 128. When phase distribution information is written to the space light modulating apparatus 148 by the laser beam from the light scanning section 145, the controller 138 controls the modulating apparatus 148 into the same state as that of the reflecting type liquid crystal display shown in FIG. 39. In this state, the laser beam from the laser light source 134 is reflected by the half mirror 142 and is inputted as a reproduction light, thereby displaying a solid image through the half mirror 142.

Figure 41:
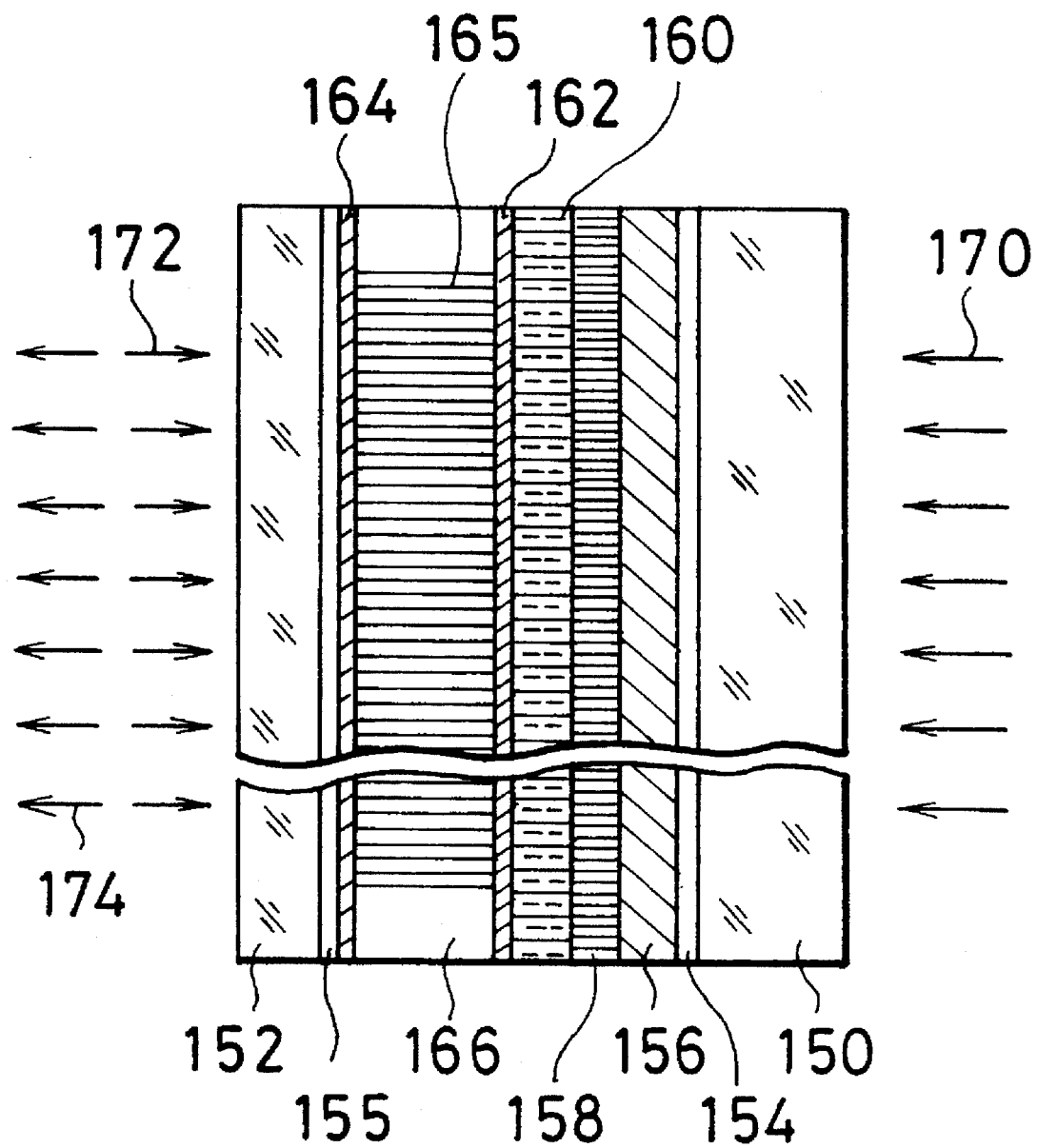
FIG. 41 is an explanatory diagram of a structure of the optical writing type space light modulating apparatus which is used in FIG. 40.

FIG. 41 shows an internal structure of the optically writable space light modulating apparatus of FIG. 40. A transparent electrode 154, a photoconducting section 156, and a light shielding layer 158 are provided subsequent to a glass substrate 150 on the incident side of a writing light 170. A dielectric mirror 160 is provided subsequent to the light shielding layer 158. A glass substrate 152 is provided on the left side into which a reproduction light 172 enters. A transparent electrode 155 is subsequently provided. A liquid crystal 165 is arranged between a transparent electrode 155 and the dielectric mirror 160 through orientation films 164 and 162.

In the operation of the space light modulating apparatus 148 of FIG. 41, when the writing light 170 is first received by the photoconducting section 156, a resistance value of the photoconducting section drops as the light intensity is large. When the resistance value of the photoconducting section 156 changes, the resistance value of the photoconducting section 156 changes although the driving voltage is constant. Thus, the voltage which is applied across the liquid crystal 165 through the dielectric mirror 160 changes by a level corresponding to only the resistance value. When the voltage which is applied to the liquid crystal changes as mentioned above, the refractive index changes. When the incident reproduction light 172 is reflected by the dielectric mirror 160 and is returned, the reproduction light becomes a modulation light 174 which was subjected to the phase modulation.

Figure 42:
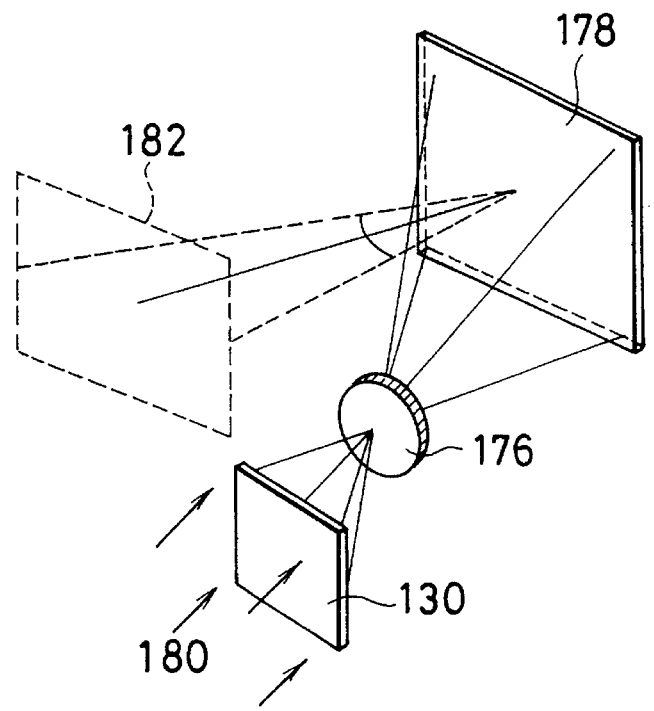
FIG. 42 is an explanatory diagram of a stereoscopic display apparatus of the invention using a magnifying screen.

FIG. 42 shows another embodiment of a stereoscopic display apparatus of the invention. In the embodiment, a reproduction light 180 enters the space light modulating apparatus 130 using a transmitting type liquid crystal display or the like which expressed the calculated phase distribution and is modulated. The modulation light from the space light modulating apparatus 130 is enlarged by a projection optical system 176 and is projected to a hologram screen 178, thereby enabling a solid image to be seen in a range of visual field 182 of a visual field angle θ.

Figure 43:
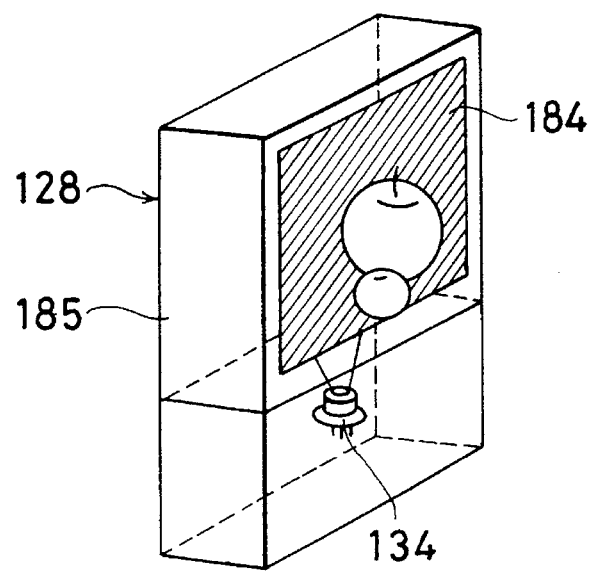
FIG. 43 is an explanatory diagram of a stereoscopic display apparatus of the invention using a space light modulating apparatus with which a refractive hologram for preventing the transmission of the 0th order light is integrated.
Figure 44:
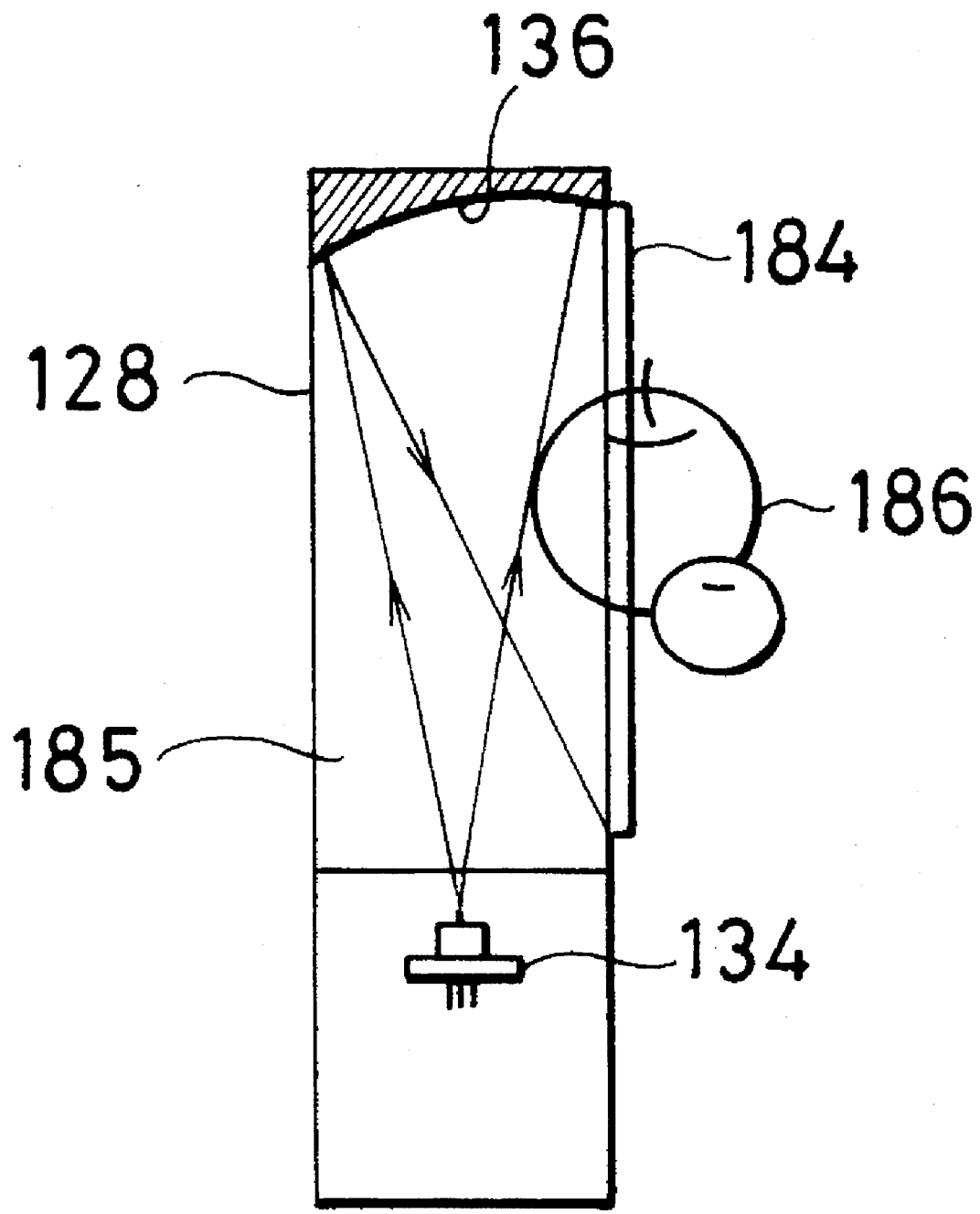
FIG. 44 is an explanatory diagram of an internal structure of the apparatus of FIG. 40.

FIG. 43 shows another embodiment of a stereoscopic display apparatus of the invention and is characterized in that the hood to prevent the 0th order light is unnecessary. That is, a space light modulating apparatus 184 with which a refracting body 185 to suppress the emission of the 0th order light is integrated is provided for the apparatus main body 128. In the stereoscopic display, as shown in FIG. 44, a spherical wave from the laser light source 134 is led to the refractive body 185 and is reflected by the collimating mirror 136 and is irradiated to the space light modulating apparatus 184 integrated with the refracting body 185 at an incident angle which is equal to or larger than the critical angle. Due to this, the 0th order light is totally reflected, thereby preventing that the 0th order light goes out. Therefore, the hood to prevent the 0th order light is unnecessary.

(Color stereoscopic display)

Figure 45:
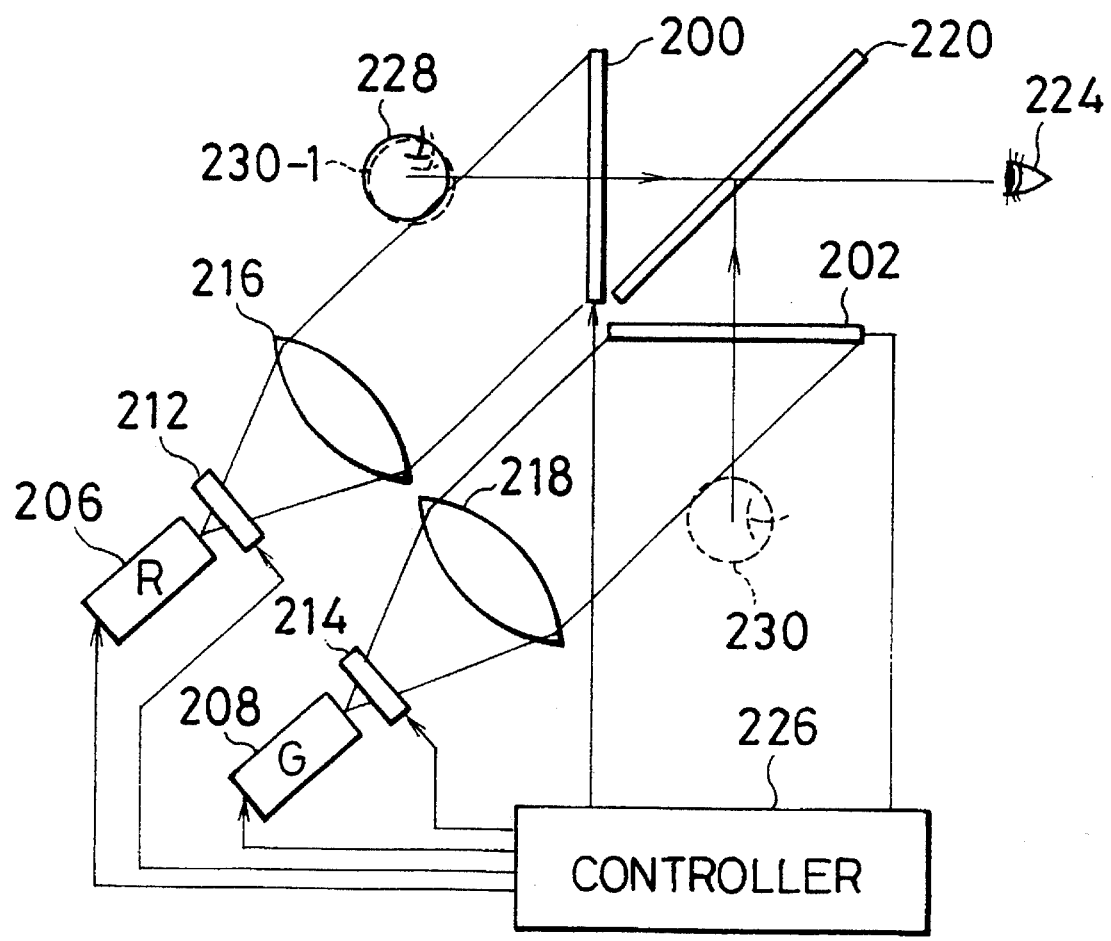
FIG. 45 is an explanatory diagram of a stereoscopic display apparatus of the invention for executing a color stereoscopic display by using two components of R and G.

In the case of displaying a color solid image according to the invention, it is sufficient that the formation of the 3-dimensional information in step S2, the formation of the 2-dimensional image in step S3, and the calculation of the phase distribution in step S4 shown in FIG. 6 are executed for every component of, for example, R, G, and B. FIG. 45 shows an embodiment of a color stereoscopic display apparatus for performing a multicolor display by using two stereoscopic display apparatuses. A space light modulating apparatus 200 is driven in accordance with the phase distribution calculated with respect to, for instance, the R component by a controller 226. A space light modulating apparatus 202 is driven in accordance with the phase distribution calculated with respect to the G component. Reproduction lights are irradiated to the space light modulating apparatuses 200 and 202 from laser light sources 206 and 208 through shutters 212 and 214 and collimating lenses 216 and 218, thereby displaying an R component solid image 228 and a G component solid image 230. The G component solid image 230 is reflected by a half mirror 220 and is seen by eyes 224 of the observer. At the same time, the R component solid image 228 passes through the half mirror 220 and enters the eyes 224. Consequently, the observer can see a synthetic color solid image in which the G component solid image 230-1 has been overlapped to the R component solid image 228.

Figure 46:
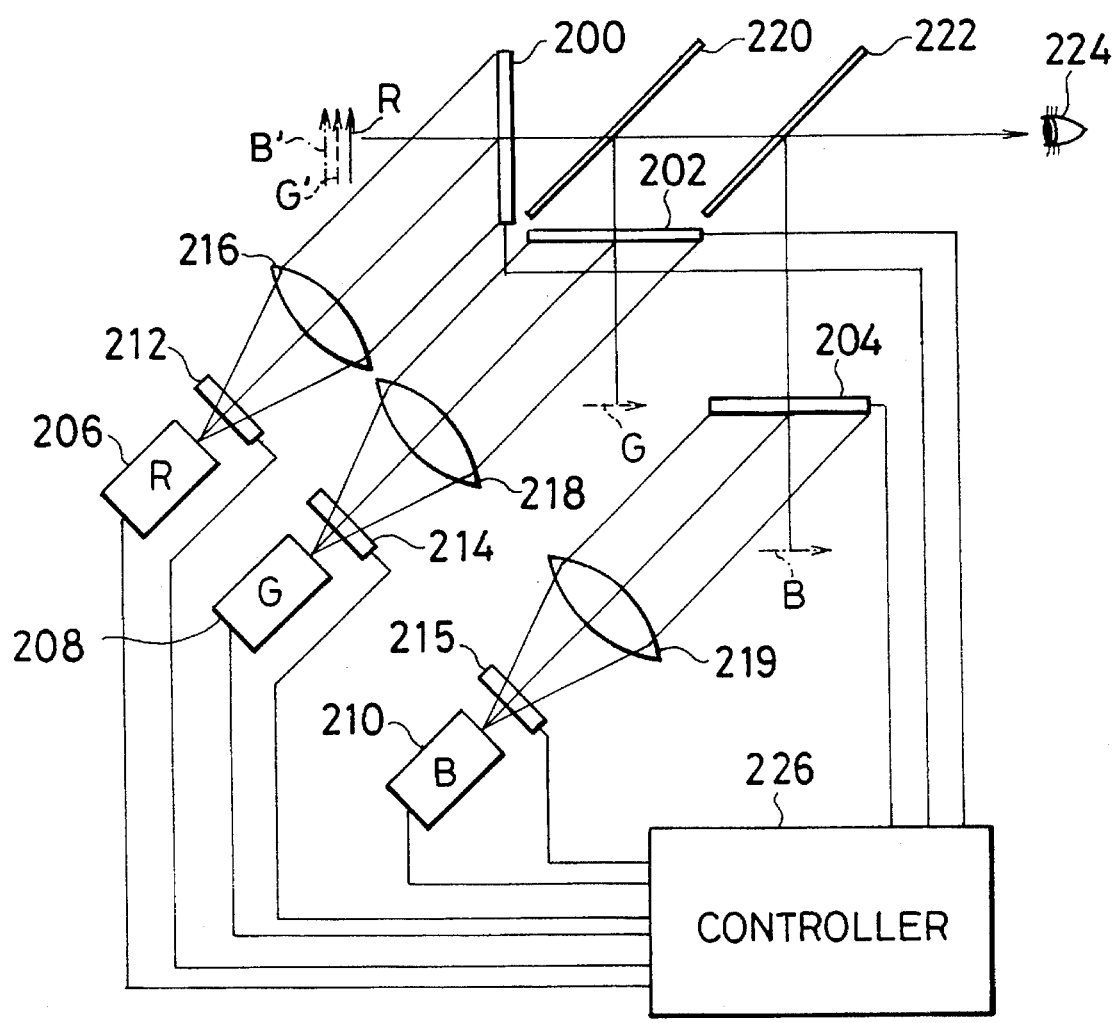
FIG. 46 is an explanatory diagram of a stereoscopic display apparatus of the invention for performing the color stereoscopic display by using three components of R, G, and B.

FIG. 46 shows another embodiment of a color stereoscopic display apparatus of the invention and is characterized in that a phase distribution is calculated for each of the RGB components and a synthetic color image is displayed. Namely, in the embodiment of FIG. 46, in addition to the embodiment of FIG. 45, a laser light source 210, a shutter 215, and a collimating lens 219 are provided as a display system of the B component, and a space light modulating apparatus 204 which is driven in accordance with the phase distribution calculated with respect to the B component is provided. Further, a half mirror 222 is added in correspondence to the space light modulating apparatus 204. In the embodiment as well, a color synthetic solid image of the R, G, and B components shown by arrows can be observed by the eyes 224 of the observer.

Figure 47:
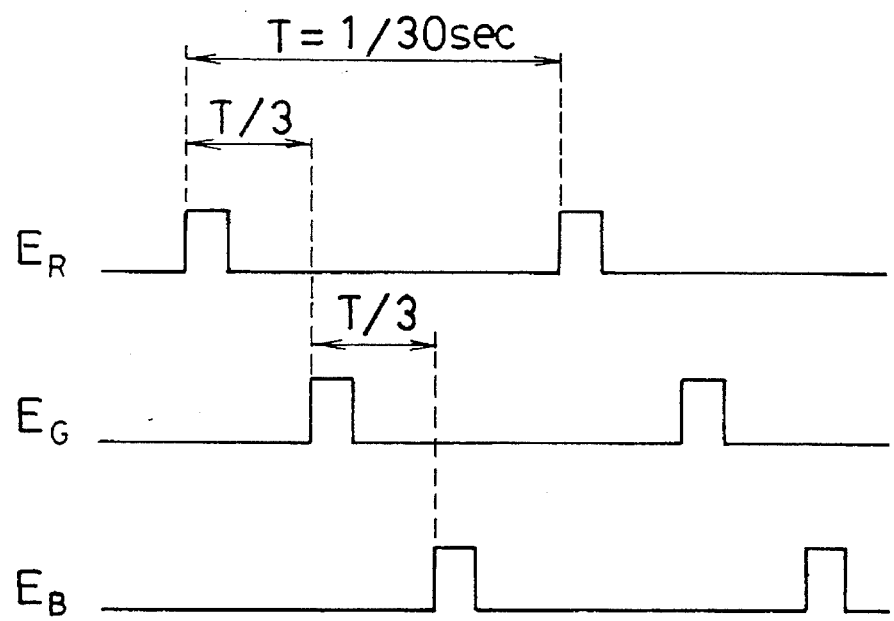
FIG. 47 is a timing chart for time-divisionally synthesizing and displaying the color components in FIG. 46.

A timing chart of FIG. 47 shows driving signals $E_R$, $E_G$, and $E_B$ to time-divisionally display the RGB components by opening or closing the shutters 212, 214, and 215 by the controller 226 in FIG. 46. The driving signals $E_R$, $E_G$, and $E_B$ are generated so as to be repeated at a period of time T =1/30 second and so as to have a timing delay of (T/3), respectively. In the case of two R and G components in FIG. 45, a timing deviation between the two signals $E_R$ and $E_G$ is set to (T/2).

Figure 48:
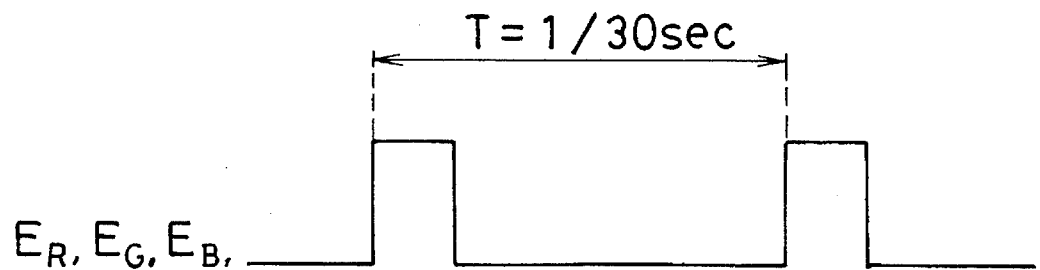
FIG. 48 is a timing chart for position dividing the color components in FIG. 46 and at the same time for synthesizing and displaying.

A timing chart of FIG. 48 shows another driving method in FIGS. 45 and 46. In the embodiment, the shutters are opened in a group at a period of T=1/30 second and solid images of two or three color components are simultaneously displayed at different positions, thereby color synthesizing.

According to the invention as mentioned above, in a moving image display such that the object position chances with the elapse of time, a phase distribution is calculated under the condition such that the interval between the object position and the virtual screen is always set to a value within the allowable range so as not to give a fatigue to the eyes and a solid image is dynamically displayed. Therefore, even when the position of the solid image changes in the moving image display, the fatigue which is exerted on the observer can be minimized.

The invention is not limited to the above embodiments but many variations and modifications are possible. The invention is also not limited to the numerical values shown in the embodiments.

What is claimed is:

1. A stereoscopic display method, comprising:

forming three-dimensional information whose image position changes with the elapse of time;

setting a virtual screen plane to form a two-dimensional image at a position within a range of a predetermined limit distance which changes in correspondence to a distance from a visual point position of an observer to said image position, while tracing the image position which was obtained from the three-dimensional information formed in said three-dimensional information forming step and which changes with the elapse of time;

forming a plurality of two-dimensional images of different visual directions from said three-dimensional information onto the virtual screen plane set in said virtual screen plane setting step;

calculating a phase distribution at a hologram forming surface from said plurality of two-dimensional images formed in said two-dimensional image forming step;

expressing the phase distribution obtained in said phase distribution calculating step onto the hologram forming surface; and irradiating a reference light to the phase distribution expressed in said hologram expressing step and converting into an optical wave front, thereby displaying a solid image.

2. A method according to claim 1, wherein said phase distribution calculating step comprises dividing the hologram forming surface into micro segment hologram regions and calculating the phase distribution from the two-dimensional images when they are seen from said segment holograms.

3. A method according to claim 1, wherein said phase distribution calculating step comprises dividing the two-dimensional image in the vertical direction into image regions which are long in the horizontal direction, dividing the hologram forming surface for every said image divisional region, and calculating the phase distribution.

4. A method according to claim 1, wherein said virtual screen plane setting step comprises setting, for a plurality of objects, a virtual screen position which changes with the elapse of time.

5. A method according to claim 1, wherein said virtual screen plane setting step comprises regarding a plurality of objects as one object and setting a virtual screen position which changes with the elapse of time.

6. A stereoscopic display method, comprising:

forming three-dimensional information in which an image position changes with the elapse of time;

setting a virtual screen plane to form a two-dimensional image at a position within a range of a predetermined limit distance which changes in correspondence to a distance from a visual point position of an observer to said image position, while tracing the image position which was obtained from the three-dimensional information formed in said three-dimensional information forming step and which changes with the elapse of time;

forming a plurality of two-dimensional images having parallaxes in the horizontal direction onto the screen plane set in said virtual screen plane setting step as projection images of said three-dimensional information when they are seen from regions which are obtained by dividing a hologram forming surface in the horizontal direction and which are long in the vertical direction;

calculating a phase distribution at the hologram forming surface from said plurality of two-dimensional images formed in said two-dimensional image forming step;

expressing the phase distribution of a solid image obtained in said phase distribution calculating step onto the hologram forming surface; and irradiating a reference light to said phase distribution expressed in said holograms expressing step and converting the reference light into an optical wave front, thereby displaying a solid image.

7. A method according to claim 6, wherein said phase distribution calculating step comprises dividing the hologram forming surface into micro segment hologram regions and calculating a phase distribution from the two-dimensional image when it is seen from each of said segment holograms.

8. A method according to claim 6, wherein said phase distribution calculating step comprises dividing the two-dimensional image in the vertical direction into image regions which are long in the horizontal direction, dividing the hologram forming surface for every said image divisional region, and calculating a phase distribution.

9. A method according to claim 6, wherein said virtual screen plane setting step comprises setting, for a plurality of objects, a virtual screen position which changes with the elapse of time.

10. A method according to claim 6, wherein said virtual screen plane setting step comprises regarding a plurality of objects as one object and setting a virtual screen position which changes with the elapse of time.

11. A stereoscopic display apparatus, comprising:

three-dimensional information forming means for forming three-dimensional information in which an image position changes with the elapse of time;

virtual screen plane setting means for setting a virtual screen plane to form a two-dimensional image at a position within a range of a predetermined limit distance which changes in correspondence to a distance from a visual point position of an observer to said image position, while tracing the image position which was obtained from said three-dimensional information formed by said three-dimensional information forming means and which changes with the elapse of time;

two-dimensional image forming means for forming a plurality of two-dimensional images in different visual directions from said three-dimensional information onto the virtual screen plane set by said virtual screen plane setting means,;

phase distribution calculating means for calculating a phase distribution at a hologram forming surface from said plurality of two-dimensional images formed by said two-dimensional image forming means;

hologram expressing means for expressing the phase distribution obtained by said phase distribution calculating means onto the hologram forming surface; and wave front converting means for irradiating a reference light to the phase distribution expressed by said hologram expressing means and converting said reference light into an optical wave front, thereby displaying a solid image.

12. A stereoscopic display apparatus, comprising:

three-dimensional information forming means for forming three-dimensional information in which an image position changes with the elapse of time;

virtual screen plane setting means for setting a virtual screen plane to form a two-dimensional image at a position within a range of a predetermined limit distance which changes in correspondence to a distance from a visual point position of an observer to said image position, while tracing the image position which was obtained from said three-dimensional information formed by said three-dimensional information forming means and which changes with the elapse of time;

two-dimensional image forming means for forming a plurality of two-dimensional images having parallaxes in the horizontal direction onto the virtual screen plane set by said virtual screen plane setting means as projection images of said three-dimensional information when they are seen from regions which are obtained by dividing a hologram forming surface in the horizontal direction and which are long in the vertical direction;

phase distribution calculating means for calculating a phase distribution at a hologram forming surface from said plurality of two-dimensional images formed by said two-dimensional image forming means;

hologram expressing means for expressing said phase distribution of a solid image obtained by said phase distribution calculating means onto the hologram forming surface; and wave front converting means for irradiating a reference light to the phase distribution expressed by said hologram expressing means and converting said reference light into an optical wave front, thereby displaying a solid image.

13. A method according to claim 1, wherein in said virtual screen plane setting step, the virtual screen plane is set to the position which passes through at least the center of gravity of an object.

14. A method according to claim 6, wherein in said virtual screen plane setting step, a virtual screen plane is set to a position which passes through at least the center of gravity.

* * * * *

UNITED STATES PATENT AND TRADEMARK OFFICE
CERTIFICATE OF CORRECTION

PATENT NO. : 5,561,537                Page 1 of 2
DATED      : October 1, 1996
INVENTOR(S): Hirokazu ARITAKE et al.

It is certified that error appears in the above-indentified patent and that said Letters Patent is hereby corrected as shown below:

Column 6

Line 65, after "the", insert --angle--; and after "convergence", delete "angle".

Column 8

Line 12, "zones" should be --zone--;

Line 20, after "for", insert --every--; and "zones" should be --zone--.

Column 9

Line 21, "$_H=R^2+0^2+2 \cdot R \cdot 0 \cdot \cos(\phi_o-\phi_r)$" should be --$_H=R^2+0^2+2 \ast R \ast 0 \ast \cos(\phi_o-\phi_r)$--;

Line 25, change "Of" to --of--;

Line 39, "$T=I_H \cdot R \cdot \exp(j\phi) \propto 2 \cdot 0 \cdot \cos(\phi_o-\phi_r) = 0 \cdot \exp(j\phi_o) + 0 \cdot \exp\{-j(\phi_o-2\cdot\phi_r)\}$" should be -- $T = I_H \ast R \ast \exp(j\phi) \propto 2 \ast 0 \ast \cos(\phi_o - \phi_r) \ast \exp(\phi_r) = 0 \ast \exp(j\phi_o) + 0 \ast \exp\{-j(\phi_o - 2\ast\phi_r)\}$ ... (2)

Line 52, "$\phi=0$" should be --$\phi_r=0$--;

Line 58, "$I_H=\Sigma_i\{(I_i/r_i) \cdot \cos(k \cdot r_i)\}$" should be

--$I_H=\Sigma_i\{(I_i/r_i) \ast \cos(k \ast r_i)\}$--.

UNITED STATES PATENT AND TRADEMARK OFFICE
CERTIFICATE OF CORRECTION

PATENT NO. : 5,561,537
DATED : October 1, 1996
INVENTOR(S) : Hirokazu ARITAKE et al.

It is certified that error appears in the above-indentified patent and that said Letters Patent is hereby corrected as shown below:

Column 10

Line 18, "n" should be --$\underline{n}$--;

Line 19, "m" should be --$\underline{m}$--;

Line 22, "NOW" should be --Now--.

Column 11

Line 34, "m" should be --$\underline{m}$--;

Line 63, "$A_{i+}$" should be --$A_{i+1}$--.

Column 12

Line 59, change "$S_{01}$ to $S_{01}$," to --$S_{01}$ to $S_{0m}$,--.

Column 13

Line 4, after "are", insert --calculated--.

Column 16

Line 60, delete "of".

Signed and Sealed this

Twenty-fifth Day of February, 1997

Attest:

BRUCE LEHMAN

*Attesting Officer*      *Commissioner of Patents and Trademarks*